US012797990B2

(12) United States Patent
Okizaki et al.

(10) Patent No.: US 12,797,990 B2
(45) Date of Patent: Nov. 17, 2026

(54) WELDING WORK DATA STORAGE DEVICE, WELDING WORK ASSISTANCE SYSTEM, AND WELDING ROBOT CONTROL DEVICE

(71) Applicant: HITACHI, LTD., Tokyo (JP)

(72) Inventors: Naoya Okizaki, Tokyo (JP); Akihide Tanaka, Tokyo (JP); Isamu Takahashi, Tokyo (JP); Xudong Zhang, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1129 days.

(21) Appl. No.: 17/627,279

(22) PCT Filed: Feb. 26, 2020

(86) PCT No.: PCT/JP2020/007705
§ 371 (c)(1),
(2) Date: Jul. 11, 2022

(87) PCT Pub. No.: WO2021/009963
PCT Pub. Date: Jan. 21, 2021

(65) Prior Publication Data

US 2022/0339728 A1 Oct. 27, 2022

(30) Foreign Application Priority Data

Jul. 17, 2019 (JP) ................................ 2019-132270

(51) Int. Cl.
*B23K 9/095* (2006.01)
*B23K 9/025* (2006.01)
*B23K 31/12* (2006.01)

(52) U.S. Cl.
CPC ............ *B23K 9/0956* (2013.01); *B23K 9/025* (2013.01); *B23K 9/0953* (2013.01); *B23K 31/125* (2013.01)

(58) Field of Classification Search
CPC .... B23K 9/0956; B23K 9/025; B23K 9/0953; B23K 31/125

(Continued)

(56) References Cited

U.S. PATENT DOCUMENTS

2003/0075534 A1 4/2003 Okamoto
2013/0248505 A1 9/2013 Anayama (Continued)

FOREIGN PATENT DOCUMENTS

JP H09-076063 A 3/1997
JP 2001051712 A * 2/2001

(Continued)

OTHER PUBLICATIONS

International Search Report with English translation and Written Opinion issued in corresponding application No. PCT/JP2020/007705 dated Mar. 31, 2020.

(Continued)

*Primary Examiner* — Elizabeth M Kerr
*Assistant Examiner* — Alba T Rosario-Aponte
(74) *Attorney, Agent, or Firm* — Foley & Lardner LLP

(57) ABSTRACT

An object of the present invention is to appropriately perform a welding quality control. Therefore, a welding work data accumulation device (100) includes: a measurement unit (4, 5, 7, 9, 11, and 16) that measures a welding motion and a welding phenomenon when a welding operator (1) grips a welding torch (2) and performs welding on a welded body (3); a data analysis unit (14) that extracts an appropriate combination of a welding motion feature amount (Tw, Ht, and Sp) and a welding phenomenon feature amount (Iw, S, and Ssym) in correction with time or coordinates based on data acquired by the measurement unit (4, 5, 7, 9, 11, and (Continued)

16); and a data accumulation unit (15) that creates a database (70) based on an extraction result of the data analysis unit (14).

5 Claims, 11 Drawing Sheets

(58) Field of Classification Search
USPC ............................... 219/130.21, 130.01, 136
See application file for complete search history.

(56) References Cited

U.S. PATENT DOCUMENTS

| | | | | |
|---|---|---|---|---|
| 2017/0151634 | A1 | 6/2017 | Witney | |
| 2017/0371326 | A1 | 12/2017 | Okazaki | |
| 2018/0147665 | A1 | 5/2018 | Furuya | |
| 2021/0003993 | A1* | 1/2021 | Hashimoto | G06N 20/00 |
| 2021/0142693 | A1* | 5/2021 | Miyagi | G09B 19/24 |

FOREIGN PATENT DOCUMENTS

| | | | |
|---|---|---|---|
| JP | 2003281287 | A | * 10/2003 |
| JP | 2006-171184 | A | 6/2006 |
| JP | 4100545 | B2 | 6/2008 |
| JP | 4129342 | B2 | 8/2008 |
| JP | 5231463 | B2 | 7/2013 |
| JP | 2018-086711 | A | 6/2018 |
| WO | WO-2001/041965 | A1 | 6/2001 |
| WO | WO-2012/050108 | A1 | 4/2012 |
| WO | WO-2013/061518 | A1 | 5/2013 |
| WO | WO-2016/136209 | A1 | 9/2016 |
| WO | WO-2018/179592 | A1 | 10/2018 |

OTHER PUBLICATIONS

Extended European Search Report issued in corresponding European Patent Application No. 20840980.5, dated Jul. 25, 2023 (7 pages).

* cited by examiner

WELDING WORK DATA STORAGE DEVICE, WELDING WORK ASSISTANCE SYSTEM, AND WELDING ROBOT CONTROL DEVICE

TECHNICAL FIELD

The present invention relates to a welding work data accumulation device, a welding work support system, and a welding robot control device.

BACKGROUND ART

With the recent social situation, a manufacturing environment has greatly changed. For example, it is difficult to maintain manufacturing skills due to an increase in overseas production, an increase in procured products from overseas, a decrease in skilled technicians, and the like, and a quality control is exposed to a more severe situation.

In most of the skill instruction methods so far, a skilled technician directly instructs a skill to an unskilled operator. However, most of the skills acquired by the skilled technicians are based on tacit knowledge that is difficult to quantify and verbalize, and the skilled technicians are not clearly aware of the motion or judgment.

Therefore, in general, at an initial stage of skill education, there is guidance on basic motions, precautions, and the like from the skilled technician to the unskilled operator, but thereafter, the unskilled operator performs learning by observing a behavior of the skilled technician and inferring and imitating the motion or judgment performed by the skilled technician as the tacit knowledge. In addition, the skilled technician creates a motion capable of welding with high quality based on his/her experience, and not all the skilled technicians are working according to the same motion indicator. Furthermore, a skilled operator has "tips" for recovery against an abnormality or motion fluctuation randomly occurring during welding work, and it is difficult to systematically classify the tips. Therefore, in a case where the unskilled operator learns from another skilled technician, the unskilled operator cannot be skilled because the motion indicator to be imitated may be different from the motion taught in the past. For these reasons, it takes time for the unskilled operator to be skilled, and there is also a concern that the skill is imprecisely instructed and not completely instructed, and the skills of skilled technicians are lost.

On the other hand, with the development of measurement techniques in recent years, efforts have been made to measure and perform datafication on welding work of a welding operator by using various measurement instruments. A method has been proposed in which quality of measurement data is evaluated by comparing the measurement data with an exemplary motion derived from data obtained by measurement performed in the past or the like, and the measurement data is used for the quality control and training of the welding work.

For example, Paragraph 0035 of PTL 1 discloses that "such a manual welding support device includes a welder motion measurement device (hereinafter, simply referred to as a "motion measurement device") 101 and a welding environment measurement device (hereinafter, referred to as an "environment measurement device") 102 that measure information regarding a welding state of a welder PS when welding is performed as illustrated in FIG. 1, devices that are connected on a downstream side (output side) of the measurement devices 101 and 102 and perform recording and storing, management, signal processing, determination, and the like of the welding state online, that is, a welding process recording device (hereinafter, referred to as a "recording device") 103, an arithmetic processing device 104, and a welding condition determination device (hereinafter, referred to as a "determination device") 105, and a welding process display device (hereinafter, referred to as a "display device") 106 and a welding state perception presentation device (hereinafter, referred to as a "perception presentation device") 107 that present processing results of the respective devices 103 to 105 to the welder PS.

In addition, as a method for solving the problems in conventional skill instruction, efforts have been made to measure the work of the skilled technicians by using the above-described data measurement, and to acquire, as explicit knowledge, the motion or judgment performed by the skilled technicians as the tacit knowledge and reflect the motion or judgment in the welding work.

CITATION LIST

Patent Literature

PTL 1: JP 4129342 B2

SUMMARY OF INVENTION

Technical Problem

However, in the above-described technique, there is a case where a welding quality control cannot be appropriately performed.

The present invention has been made in view of the above circumstances, and an object of the present invention is to provide a welding work data accumulation device, a welding work support system, and a welding robot control device capable of appropriately controlling welding quality.

Solution to Problem

In order to solve the above problems, a welding work data accumulation device of the present invention includes: a measurement unit that measures a welding motion and a welding phenomenon when a welding operator grips a welding torch and performs welding on a welded body; a data analysis unit that extracts an appropriate combination of a welding motion feature amount and a welding phenomenon feature amount in correlation with time or coordinates based on data acquired by the measurement unit; and a data accumulation unit that creates a database based on an extraction result of the data analysis unit.

Advantageous Effects of Invention

As described above, according to the present invention, the welding quality control can be appropriately performed. For example, with the welding work data accumulation device of the present invention, the feature amount of the welding work of the welding operator is extracted and recorded, and the recorded information can be used in the welding work support system or the welding robot control device.

DESCRIPTION OF EMBODIMENTS

Outline of Embodiments

Figure 1:
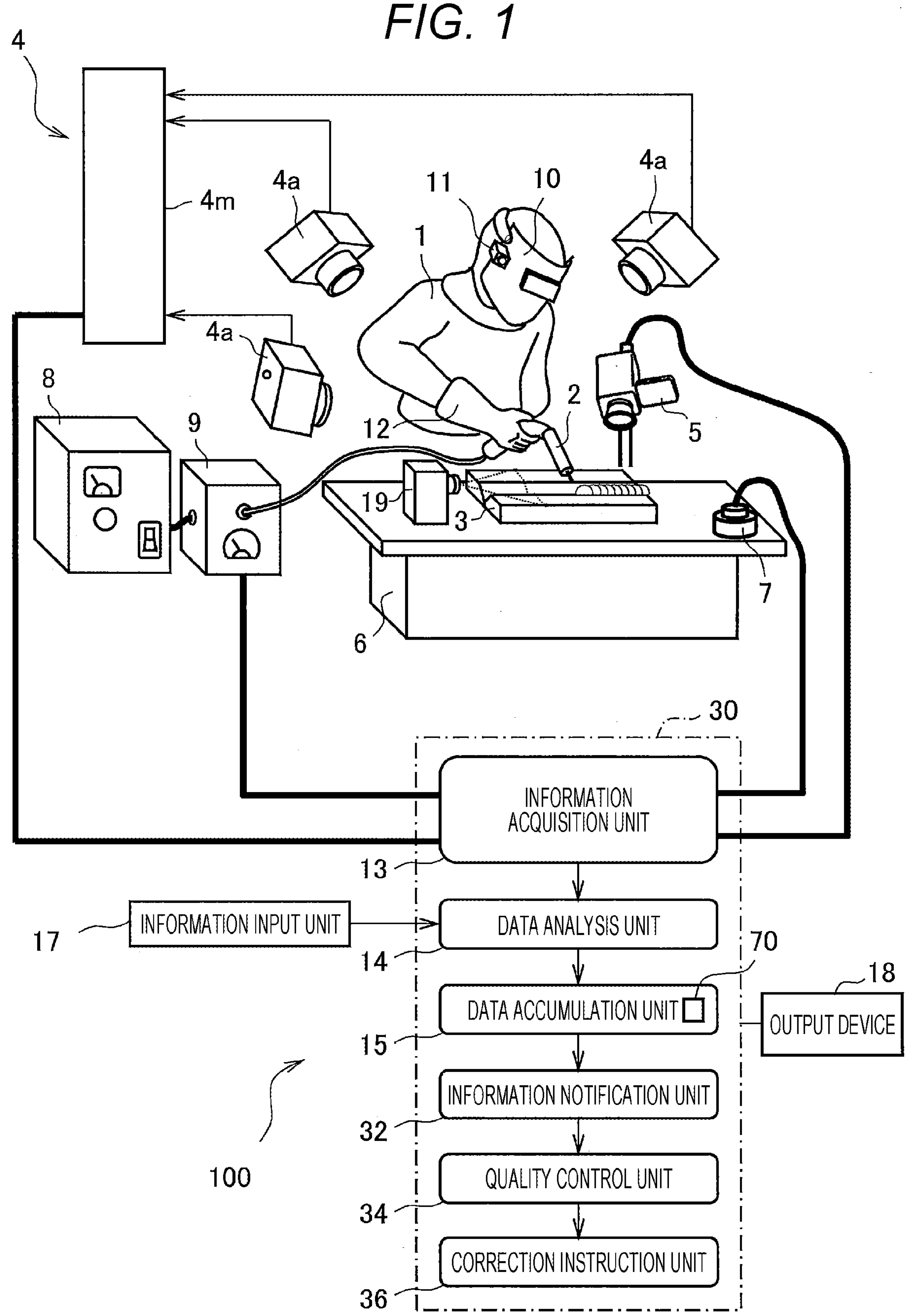
FIG. 1 is a schematic view of a welding phenomenon measurement system according to a first embodiment of the present invention.

Generally, when quality of welding work performed by a welding operator is determined, comparison with a data pattern as an exemplary motion of the welding work may be performed. Here, the following three types of data patterns are mainly conceivable as the exemplary motion.

(1) First, a data pattern of a welding motion of a specific person highly skilled at the welding work, a so-called skilled technician, may be adopted as the exemplary motion.

(2) Second, a data pattern of a welding motion when a non-destructive inspection such as an appearance inspection or an ultrasonic flaw detection or a destructive inspection such as cutting the welded body and observing a cross section is performed on a welded body welded by the welding operator, and the welded body has no defect or defects whose number is less than an acceptable number of defects, may be adopted as the exemplary motion.

(3) Third, an optimum range of the motion may be calculated in consideration of a physical phenomenon such as a characteristic of a welding arc, the amount of heat applied to a welded portion of the welded body, or a penetration amount for the target welding work to physically derive the exemplary motion.

In a case where the motion of the skilled technician described above is adopted as the exemplary motion, a skill level of the technician is evaluated by subjective judgment based on service years and quality of the welded bodies subjected to welding by the technician so far, and it is difficult to objectively evaluate the skill level. Therefore, there is a possibility that a motion deviating from an optimum motion is recorded by chance, or a correction motion performed for an abnormality or motion fluctuation randomly occurring during the welding work is recorded as an originally unrelated standard motion. In a case where the welding motion by which the welded body having fewer defects confirmed in the inspection of the welded body described above is produced is adopted as the exemplary motion, occurrence of the welding defect depends on a probability. Therefore, even in a case where the number of defects in the inspected welded body is small, the optimum motion in terms of a defect occurrence probability or work efficiency is not necessarily performed. In addition, it takes time to inspect the welded body. In a case of physically deriving the welding motion, the skilled operator makes determination based on a combination of a shape of a molten pool, welding sound, a pressure felt by the hand, and the like, and reflects the determination in a motion of a welding torch. Therefore, it is difficult to quantify "tips" and tacit knowledge of the complicated motion, and it is difficult to determine an effective exemplary motion.

Furthermore, not all skilled technicians perform the welding work in a certain motion pattern, and each individual has a different habit. For example, in a motion of a tip of the welding torch, a weaving motion (a motion that swings the tip of the welding torch in a direction intersecting a welding direction) includes a motion that smoothly moves along a trajectory whose shape is similar to a sinusoidal waveform, a motion that moves along a sawtooth-like trajectory, which is generally called a zigzag motion, a motion that moves along a spiral trajectory, which is generally called a counterbore motion, and the like, and it is considered that there is no correct answer for a question that which one of the motions is the optimum motion. In addition, there is an operator who selectively makes these motions depending on an angle and a shape of the welded portion, and there is no exemplary motion common to all welding works with different conditions. Furthermore, the skilled operator has "tips" for a motion that performs recovery against an abnormality or motion fluctuation randomly occurring during the welding work, and it is difficult to instruct those skills by a conventional method in which comparison with a uniform exemplary motion is performed.

These skills in the welding work are often minute motion changes in which the tip of the welding torch is moved in the order of mm, and in particular, unless the motion of the tip of the welding torch is measured in detail in the order of less than cm, it is difficult to extract feature amounts of these motions. In PTL 1 described above, the feature amount of the welding motion made by the operator is measured, and the quality is determined and presented by performing comparison with the exemplary motion at the time of appropriate welding measured in advance. However, a specific method for deriving the exemplary motion is not explicitly described. In addition, since there is no correlation with a signal associated with a welding phenomenon during the welding work, it is difficult to objectively determine whether or not normal motion correction is performed in a case where the skill of the operator or the motion deviates from the welding motion recorded as the exemplary motion during the welding work. In addition, a measurement unit that measures the motion of the tip of the welding torch in detail in the order of less than cm is not described.

Therefore, in embodiments to be described later, for manual welding or semi-automatic welding, information regarding the motion and welding quality of the welding operator (various signals caused by the welding phenomenon and defects of the welded body) is digitized to extract the feature amount in order to improve efficiency in education or welding work. Then, the feature amount of the motion and the information regarding the quality are accumulated in a welding database in correlation with each other, and an exemplary motion simulating the "tips" for the motion of the skilled technician is derived.

A welding work data accumulation device according to the embodiment described below includes:

a data accumulation unit that records a welding torch motion during the welding work in a manual welding work or a semi-automatic arc welding work performed by the welding operator to extract the feature amount, extracts, as a "welding quality parameter", the feature amount extracted by recording various signals caused by the welding phenomenon during the welding work, and creates a database in which the "feature amount of the welding motion" and the "welding quality parameter" described above are classified and recorded in correlation with time or coordinates.

The welding work data accumulation device further includes:

means that inputs information regarding a welding work environment;

a measurement device that measures coordinates of the tip of the welding torch of the operator during the welding work with an accuracy of less than 1 cm;

a measurement unit that includes means measuring various signals generated due to the welding phenomenon during the welding work;

arithmetic processing means that extracts the feature amount from a result of measurement of the torch motion and the welding phenomenon, the result being obtained by the data measurement means; and arithmetic processing means that classifies the acquired data according to the input welding condition and the feature amount extracted from the measurement result, in which the data accumulation unit records and accumulates an arithmetic processing result obtained by extracting the feature amount of the data obtained by the data measurement means and a classification result in the database.

Further, in addition to the above configuration, it is more desirable to include arithmetic processing means that records "quality inspection information" acquired by performing appearance inspection or defect measurement on the welded body, and analyzes a correlation with an arithmetic processing result obtained by extracting the feature amount of the welding motion described above, and means that accumulates the arithmetic result in the data accumulation unit described above. "Quality inspection information" of the welded body is preferably any one or more of data obtained by correlating information indicating various welding qualities such as a pit volume, an undercut volume, overlap, bead surface cracking, arc strike, spatter, bead meandering, welding deformation amount, insufficient penetration or poor fusion measured by an ultrasonic flaw detection test, a radiation transmission test, a magnetic powder flaw detection test, destructive inspection for the welded body, or the like, internal cracking, blow hole, slag entrainment, and residual stress with coordinates or time of occurrence position and distribution, the information being obtained from results of visual appearance inspection or bead surface measurement performed using a laser displacement meter.

The arithmetic processing means that analyzes the correlation between the "feature amount of the welding motion" and the "welding quality parameter" or the "quality inspection information" is preferably a method of classifying the change of the "welding quality parameter" or the "quality inspection information" for each system and correlating the "feature amount of the welding motion" with coordinates or time.

It is preferable that the means and feature amounts for measuring various signals generated due to the welding phenomenon described above are data obtained by correlating coordinates or time during the welding work with one or more of the followings:

the amount of heat applied obtained from arc voltage/current measurement means, information on occurrence of arc interruption or short circuit, information on a width of the molten pool formed during the welding work, a length of the molten pool, an area of the molten pool, and the relative position with respect to the tip of the torch obtained from molten pool observation means, information on the spread of the arc and the arc length obtained from arc observation means, and information on the amount of spatter generated, a frequency of the arc interruption, and a frequency of the short circuit obtained from image capturing means of the welding work, information on a sound pressure and a frequency caused by the welding phenomenon, the information being obtained from welding sound measurement means, pressure information acquired from a pressure sensor provided on a glove of the welding operator, and temperature distribution of the welded body and temperature distribution of the molten pool obtained by temperature measurement means.

In addition, the above-described coordinates of the tip of the welding torch are three-dimensional coordinates in the Euclidean space, and it is preferable to measure the temporal change of the coordinates. Further, it is more preferable to record the coordinates of the tip of the welding torch with a coordinate resolution of 1 mm or less and a time resolution of 10 Hz or more. In many cases, the welding motion is made with a width of several cm at an interval of about several seconds, and thus, it is possible to extract the feature amount of the motion of the tip of the torch performed by the skilled technician described above.

It is preferable to extract, from the measured coordinates of the tip of the welding torch, one or more of the followings:

a movement distance in the welding direction, a speed in the welding direction, a temporal change of the coordinates in a direction orthogonal to the welding direction (that is, a direction in which the torch is swung), a speed in a direction orthogonal to the welding direction, a distance between the welded portion and the torch (that is, a torch height), a speed in a direction perpendicular to the welding direction (that is, a torch height direction), a frequency of a periodic change of the coordinates and the change of the frequency, and an amplitude and a variation of the amplitude of the periodic change of the coordinates.

It is preferable to include means that measures one or more of an advancing/retreating angle of the welding torch in the welding direction, an inclination of the welding torch orthogonal to the welding direction, and a roll having the welding torch as an axis, in addition to the coordinates of the tip of the welding torch described above.

Further, means that measures information regarding the posture of the operator, such as the inclination of the arms and shoulders and the orientation of the face of the welding operator, in addition to the information described above, may be included.

The information regarding the welding work environment described above is preferably one or more of a type of a welding device (TIG welding, MAG welding, MIG welding, or CO2 gas welding), a type of shielding gas used for welding, a flow rate of the shielding gas used for welding, a shape and material of a welding wire, a feeding speed of the welding wire, a shape of the welded body, a shape (a groove depth, a gap width, or the like) and material of the welded portion, setting of a welding power supply, and information indicating the skill level of the operator (years of experience, in-house certification index, and the like).

In addition, the shape of the welded portion (a root gap, a groove angle, or the like) may be acquired during the welding work by using means (optical camera, touch sensor, laser displacement meter, or the like) that measures the shape of the welded portion prior to using the welding torch of the operator during the welding work.

The arithmetic processing means that classifies data acquired according to the feature amount is preferably means that can analyze a correspondence relationship between the feature amount of the welding motion and the welding quality parameter by using coordinate information or time information.

The means that can analyze the correspondence relationship described above preferably associates the feature amount of the welding motion with the change of the welding quality parameter by using the coordinate information or time information, and analogizes the feature amount of the welding motion correlated with the change of the welding quality parameter.

Furthermore, it is more preferable that the motion can be classified into a “causative motion” that has caused the change of the welding quality parameter and the “correction motion” in which the change of the welding quality parameter is recognized in a manner in which “the operator is indirectly notified of a change of the shape of the molten pool, a change of the welding sound, a change of the pressure felt by the hand, or a change detected by the measurement device”, and the motion is changed in order to recover the change.

Moreover, it is more preferable that whether or not the correction motion is an “appropriate correction motion” that can improve the welding quality can be determined by comparing a deviation or defect of a signal caused by the welding phenomenon after the “correction motion” is performed.

It is preferable that the data accumulation unit that records and accumulates the arithmetic processing result and the classification result described above classifies and records, in an associative manner, any one of the followings:

- the welding work condition described above,
- a feature amount representing an average feature of the welding quality parameter,
- the change of the welding quality parameter,
- a feature amount representing an average feature of the feature amount of the welding motion,
- the change of the feature amount of the welding motion,
- a parameter representing an average feature of the welding quality,
- a parameter representing a defect occurrence frequency, and
- a defect type.

Further, a welding skill training system includes a mechanism that notifies the operator of:

- a feature amount extracted from a result of measurement of the coordinates of the tip of the torch during the welding work performed by an unskilled operator, and
- information (for example, a score) regarding quality of the welding motion obtained from a deviation or a Mahalanobis distance with respect to the feature amount of the exemplary welding motion for a shape and a material of a welding material, the deviation or the Mahalanobis distance being derived by referring to the welding database constructed in advance.

It is preferable to include, in addition to the above configuration, a mechanism that measures a signal caused by the welding phenomenon during the welding work of the unskilled operator, extracts a feature amount of the signal caused by the welding phenomenon, derives a deviation or a Mahalanobis distance with respect to the feature amount of the exemplary welding motion, and notifies the operator of information (for example, a score) regarding quality of the welding motion obtained from the deviation or the Mahalanobis distance.

Furthermore, it is preferable to include, in addition to the above configuration, a mechanism that notifies the operator whether or not the correction motion recorded in the welding database has been performed in a case where the coordinates of the tip of the torch or the signal caused by the welding phenomenon during the welding work of the unskilled operator deviates from the exemplary welding motion by a certain amount or more.

In a case where a plurality of passes are welded, the exemplary welding motion for the shape and material of the welding material is preferably obtained by correcting the exemplary motion for the next pass based on information obtained at the time of welding the previous pass.

In addition, a welding motion assisting system includes a mechanism that instructs to perform an appropriate correction motion recorded in the welding database in a case where the coordinates of the tip of the torch of the operator or the signal caused by the welding phenomenon during the welding work deviates from the exemplary welding motion by a certain amount or more.

In addition, a welding robot program construction system includes a mechanism that instructs to perform an appropriate correction motion recorded in the welding database with respect to deviation of a welding signal based on coordinates of a tip of a torch of a welding robot and welding information monitored and caused by the welding phenomenon.

As described above, in the embodiments to be described later, it is possible to instruct an appropriate correction motion with respect to deviation of the motion during the welding work or the signal caused by welding from the exemplary welding motion according to a welding target and a working condition.

First Embodiment

<Configuration of First Embodiment>

FIG. 1 is a schematic view of a welding phenomenon measurement system 100 (welding work data accumulation device and welding work support system) according to a first embodiment of the present invention. The welding phenomenon measurement system 100 generates a welding database 70 (database) based on, for example, a motion measurement result of a welding operator who is generally called a skilled operator.

In FIG. 1, a welding operator 1 wears a light shielding mask 10 and a glove 12, grips a welding torch 2, and performs the welding work on a welded body 3 placed on a welding workbench 6. This welding work is semi-automatic arc welding. That is, a welding wire (not illustrated) serving as both an electrode and a filler metal is automatically supplied to the welding torch 2 by a feeding device (not illustrated). However, the present embodiment may also be applied to manual welding in which the filler metal is not automatically supplied.

The welding phenomenon measurement system 100 is a system that measures this welding phenomenon, and includes a motion capture system 4 (measurement unit), a molten pool observation camera 5 (measurement unit), a piezoelectric element 7 (vibration sensor and measurement unit), a power supply 8, an electric measurement device 9 (measurement unit), a line-of-sight camera 11 (measurement unit), and a control device 30. An output device 18 is controlled by the control device 30, and includes a speaker, an earphone, a display, a head mounted display mounted on the welding operator 1, and the like (none of which are illustrated).

The control device 30 includes hardware as a general computer, such as a central processing unit (CPU), a random access memory (RAM), a read only memory (ROM), and a solid state drive (SSD), and the SSD stores an operating system (OS), an application program, various data, and the like. The OS and the application program are loaded in the RAM and executed by the CPU. In FIG. 1, functions implemented by the application program and the like are illustrated as blocks in the control device 30. That is, the control device 30 includes an information input unit 17 (welding work environment input unit), an information acquisition unit 13 (measurement unit), a data analysis unit 14, a data accumulation unit 15, an information notification unit 32, a quality control unit 34, and a correction instruction unit 36. A measurement instrument (for example, a laser displacement meter 19 (welded portion shape measurement unit)) that measures the shape of the welded portion may be connected to the information input unit 17.

The motion capture system 4 measures a motion of the welding torch 2 gripped by the welding operator 1 via a plurality of motion capture cameras 4*a*. The molten pool observation camera 5 captures a moving image of a molten pool generated in the welded body 3. The piezoelectric element 7 comes into contact with the welding workbench 6 and measures vibration (including sound) generated in the welding workbench 6. In addition to the piezoelectric element 7, a microphone (not illustrated) that collects sounds caused by welding may be provided. The power supply 8 supplies power for welding to the welding torch 2. The electric measurement device 9 is connected to the power supply 8, and measures a welding current and a welding voltage in the welding torch 2. The line-of-sight camera 11 is attached to the light shielding mask 10, and captures a moving image simulating a field of view of the welding operator 1.

In the illustrated example, the welded body 3 is two flat metal plates. When a predetermined welding voltage is applied to the welding wire (not illustrated) in the welding torch 2 by the power supply 8, arc discharge occurs between the welding wire and the welded body 3. The welding wire is melted by arc discharge to weld two plate-shaped metal plates, and these plate-shaped metal plates are integrated.

Figure 2:
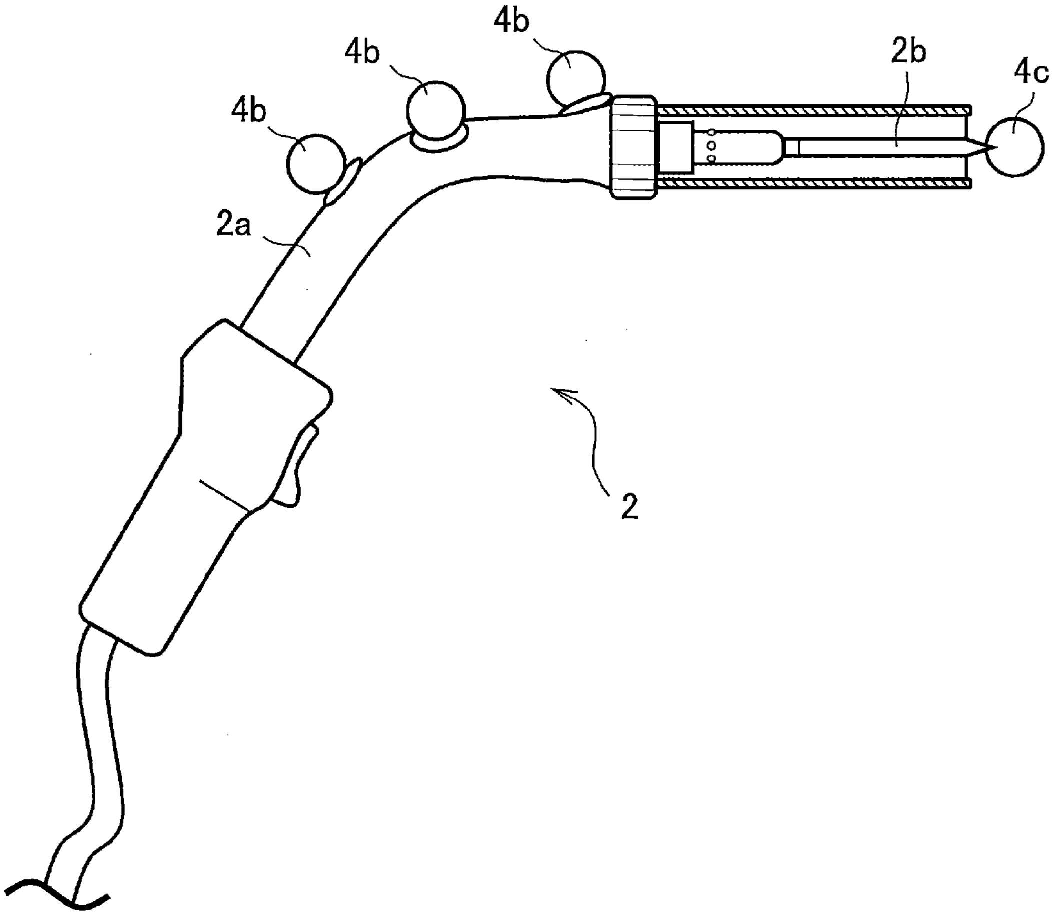
FIG. 2 is a partially cutaway side view of a welding torch.

The motion capture system 4 includes a main body portion 4*m*, a plurality of (three or more) motion capture cameras 4*a*, a plurality of motion capture markers 4*b* (see FIG. 2), and a tip marker 4*c* (see FIG. 2).

FIG. 2 is a partially cutaway side view of the welding torch 2. As illustrated in FIG. 2, the markers 4*b* are attached throughout the welding torch 2. When the camera 4*a* captures an image of the markers 4*b*, the main body portion 4*m* (see FIG. 1) acquires positions of the markers 4*b* as three-dimensional coordinate data.

In FIG. 2, the markers 4*b* attached to the welding torch 2 are illustrated, but the markers 4*b* are also attached to the light shielding mask 10, the welded body 3, and the like illustrated in FIG. 1 (not illustrated). The main body portion 4*m* of the motion capture system 4 calculates displacement, a speed, a trajectory, an acceleration, an angle, an angular velocity, and the like of the welding torch 2 based on the three-dimensional coordinate data of the markers 4*b*.

Since the welding torch 2 is a rigid body, the main body portion 4*m* of the motion capture system 4 calculates a position of a tip of the welding torch 2 based on the plurality of markers 4*b* attached to a main body portion 2*a* of the welding torch 2. Therefore, before performing the welding work, the detachable tip marker 4*c* is attached to a wire tip portion 2*b* of the welding torch 2. Then, the main body portion 4*m* of the motion capture system 4 measures and stores a positional relationship between coordinates of the tip marker 4*c* and each marker 4*b*. In actual welding work, the tip marker 4*c* is removed, but the main body portion 4*m* of the motion capture system 4 calculates three-dimensional coordinate data of the wire tip portion 2*b* based on the three-dimensional coordinate data of each marker 4*b*.

It is preferable to select, as the motion capture system 4, a motion capture system capable of measuring the wire tip portion 2*b* with an accuracy of 1 mm or less. By performing measurement with an accuracy of 1 mm or less, fine variation of the welding torch 2 can be recorded, and the feature amount of the welding motion corresponding to the skill level and the feature amount of the welding motion corresponding to the tips for the motion made by the skilled operator can be extracted.

Figure 3:
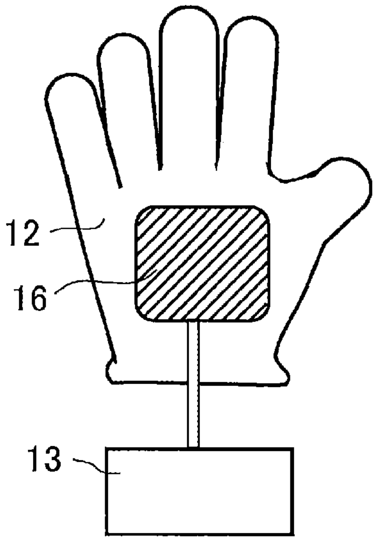
FIG. 3 is a front view of a glove.

FIG. 3 is a front view of the glove 12. A substantially rectangular piezoelectric pressure sensor 16 (torch pressure sensor and measurement unit) is attached to a palm portion (not denoted by a reference sign) of the glove 12. The piezoelectric pressure sensor 16 measures a pressure applied to the hand of the welding operator 1 (see FIG. 1) from the welding torch 2 (see FIG. 1). An output signal of the piezoelectric pressure sensor 16 is supplied to the information acquisition unit 13 (see FIG. 1).

Returning to FIG. 1, the information regarding the welding work environment and the quality inspection information of the welded body 3 are input to the information input unit 17.

The type of the welding device (TIG welding, MAG welding, MIG welding, or CO2 gas welding), the type of the shielding gas used for welding, the flow rate of the shielding gas used for welding, the shape and material of the welding wire, the feeding speed of the welding wire, the material of the welding wire, the setting of the welding power supply, and the information indicating the skill level of the operator (years of experience, in-house certification index, and the like) are input as the information regarding the welding work environment. Further, the laser displacement meter 19 that measures the shape of the welded portion is connected to the information input unit 17, and the shape of the welded portion to be welded measured by the laser displacement meter 19 is input together with information correlated with coordinates or time.

Specifically, the quality inspection information of the welded body 3 includes information obtained from a result of visual appearance inspection or bead surface measurement using the laser displacement meter for the welded body 3. These pieces of information are, for example, a pit volume, an undercut volume, overlap, bead surface cracking, arc strike, spatter, bead meandering, welding deformation amount, and the like.

The quality inspection information of the welded body 3 also includes information on various defects such as insufficient penetration or poor fusion measured by the ultrasonic flaw detection test, the radiation transmission test, the magnetic powder flaw detection test, the destructive inspection for the welded body, or the like, internal cracking, blow hole, slag entrainment, and residual stress.

These pieces of quality inspection information of the welded body 3 are input to the information input unit 17 together with coordinates of an occurrence position, coordinates of distribution, an occurrence time during the welding work, and the like.

Figure 4:
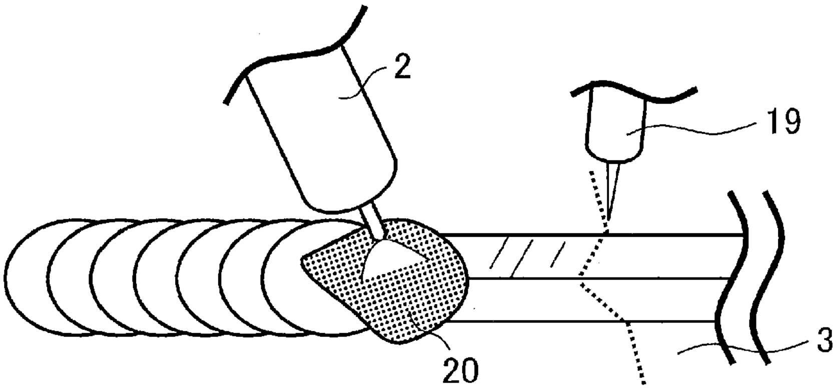
FIG. 4 is a schematic view of an operation of measuring a shape of a welded portion by a laser displacement meter.

FIG. 4 is a schematic view of an operation of measuring the shape of the welded portion by the laser displacement meter 19. The laser displacement meter 19 measures the shape of the welded portion to be welded before the welding motion in the welding direction of the welding torch 2. When the laser displacement meter 19 irradiates a measurement target portion with laser light, the laser light is reflected. The laser displacement meter 19 measures a distance between the laser displacement meter 19 and the measurement target portion based on a phase difference between the irradiation light and the reflected light. The distance is measured by causing the laser displacement meter 19 to perform scanning in a direction perpendicular to the welded portion (groove). That is, the laser displacement meter 19 obtains a cross-sectional shape of the welded portion based on coordinates of the laser displacement meter 19 and the measured distance between the sensor and the measurement target portion. Further, the laser displacement meter 19 transmits information such as a groove depth, a root gap, and a groove angle of the welded portion obtained from the cross-sectional shape measurement result to the information input unit 17.

The information acquisition unit 13 collects various data from the motion capture system 4, the molten pool observation camera 5, the piezoelectric element 7, and the electric measurement device 9 while temporally synchronizing the data.

More specifically, the data analysis unit 14 acquires a welding direction movement distance of the wire tip portion 2*b* of the welding torch 2, a welding direction speed, and a frequency of the welding motion (a frequency of the weaving motion) based on the temporal change of the three-dimensional coordinate data of the welding torch 2 acquired by the motion capture system 4.

Then, the information input unit 17 and the information acquisition unit 13 supply the collected data to the data analysis unit 14. The data analysis unit 14 analyzes a motion state of the welding torch 2 or the like and feature amounts of various data, and accumulates analysis results in the data accumulation unit 15.

Figure 5:
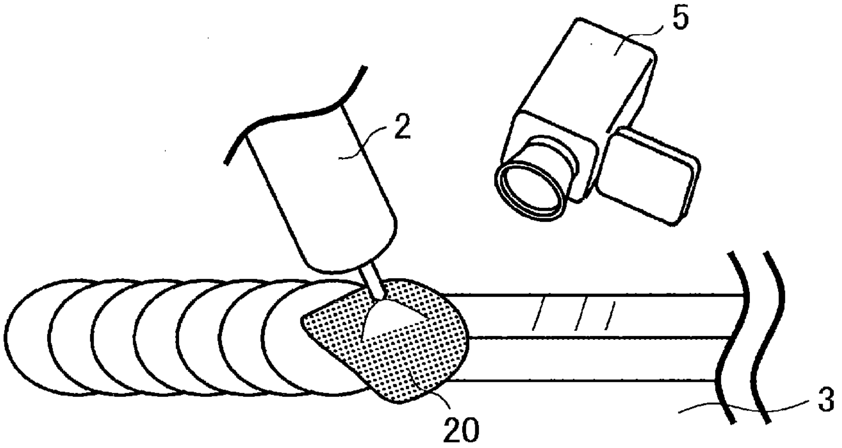
FIG. 5 is a schematic view of an operation of capturing an image of a molten pool by a molten pool observation camera.

FIG. 5 is a schematic view of an operation of capturing an image of a molten pool 20 by the molten pool observation camera 5. In the vicinity of the tip of the welding torch 2, the welded body 3 is melted, and the molten pool 20 is formed.

Figure 6:
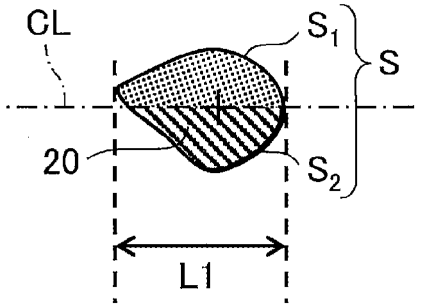
FIG. 6 is a diagram for describing symmetry of the molten pool.

FIG. 6 is a diagram for describing symmetry of the molten pool 20. In FIG. 6, a center line CL indicates a welding center position in the welding direction, that is, a direction in which the welding torch 2 advances. An area of the molten pool 20 is referred to as a molten pool area S (welding phenomenon feature amount). In the molten pool 20, an area of a region above the center line CL in the drawing is S1, an area of a region below the center line CL in the drawing is S2, and symmetry Ssym of the molten pool 20 is defined by "$Ssym=(S1-S2)/(S1+S2)=(S1-S2)/S$". In addition, the amount of heat applied to the welded portion of the welded body 3, a heat applying direction with respect to the welded portion of the welded body 3, or the like may be measured based on the image acquired by the molten pool observation camera 5.

The data analysis unit 14 of FIG. 1 acquires temporal changes of the areas S1 and S2, the molten pool area S, and the symmetry Ssym based on a moving image of the molten pool acquired by the molten pool observation camera 5. In addition to the molten pool area S, information regarding a length and width of the molten pool 20 and the shape of the molten pool area S may be acquired. The data analysis unit 14 acquires a spectrogram of vibration (sound) during welding based on an output signal of the piezoelectric element 7 that is in contact with the welding workbench 6. In addition, the data analysis unit 14 acquires temporal changes of the welding voltage and the welding current from the electric measurement device 9. Further, the data analysis unit 14 detects movement of a line of sight of the welding operator 1 based on the line-of-sight camera 11, and measures the pressure applied to the welding operator 1 from the welding torch 2 based on the output signal of the piezoelectric pressure sensor 16 (see FIG. 3) worn on the glove 12.

The information notification unit 32 of FIG. 1 has a function of notifying the welding operator 1 of information regarding the quality of the welding motion. Further, the quality control unit 34 has a function of recording the information regarding the quality of the welding motion, such that the recorded information can be referred to as necessary. The correction instruction unit 36 has a function of issuing a correction instruction to the welding operator 1 as necessary.

Note that a communication cable connecting the information acquisition unit 13 and the line-of-sight camera 11 is not illustrated in FIG. 1. However, communication means between the information acquisition unit 13 and each unit may be wireless communication or wired communication. In the above example, the motion capture system 4 acquires the motion of the welding torch 2 or the like. However, the motion of the welding torch 2 or the like may be acquired by applying image analysis using a stereo camera and various other devices such as an accelerometer.

<Operation of First Embodiment>

(Skill Determination Method)

Next, the operation of the present embodiment will be described.

First, the motion of the skilled operator who has long experience in the welding work is measured using the welding phenomenon measurement system 100 (see FIG. 1) described above, and the feature amount is analyzed and recorded in the data accumulation unit 15.

Figure 7:
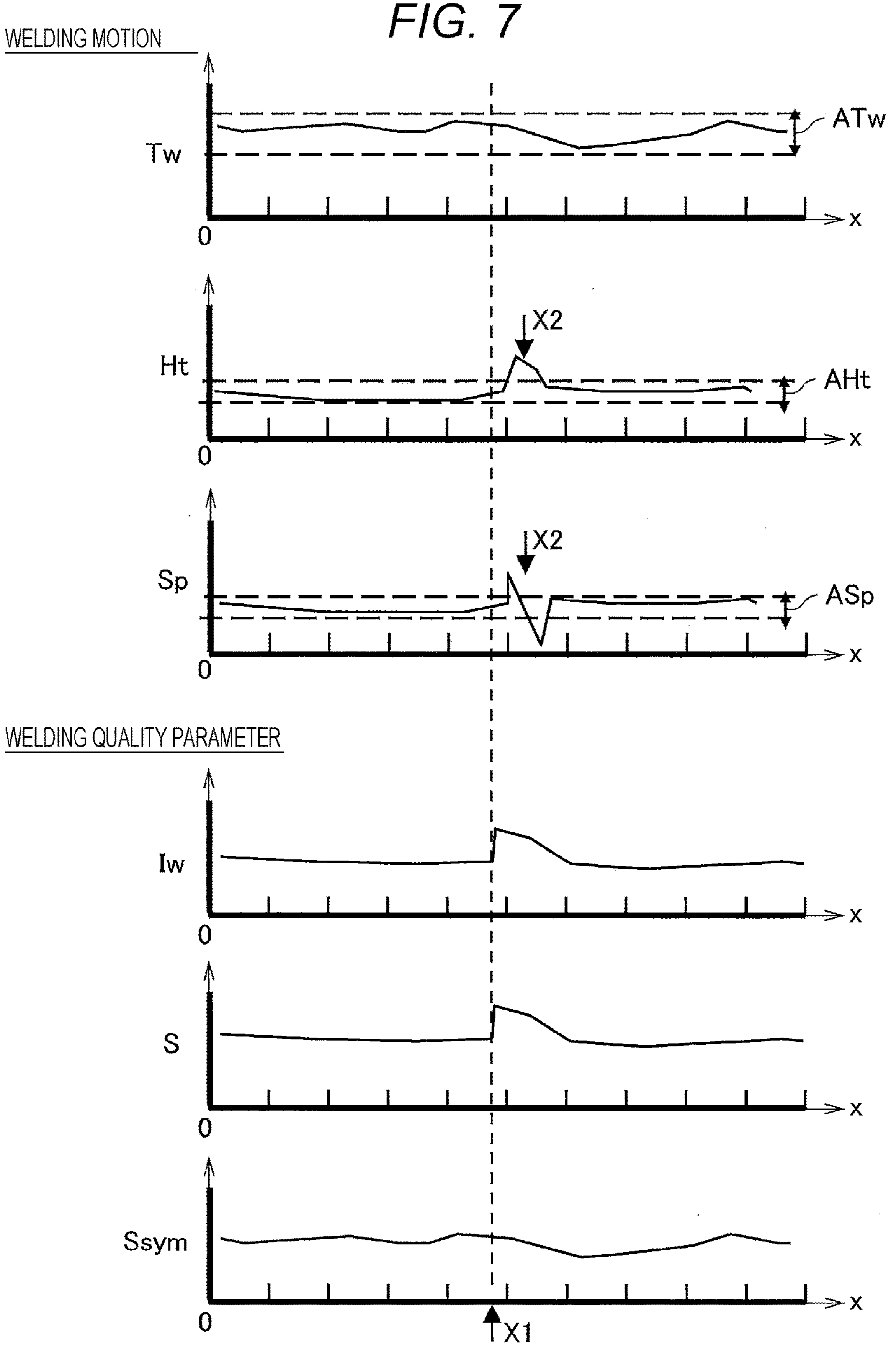
FIG. 7 is a diagram illustrating an example of feature amounts and the like of a skilled operator.

FIG. 7 is a diagram illustrating an example of the feature amounts and the like of the skilled operator.

A horizontal axis x in various graphs illustrated in FIG. 7 represents the amount of movement in the welding direction. A weaving interval Tw (welding motion feature amount) is an interval of the weaving motion, and an appropriate range thereof is referred to as an appropriate weaving interval range ATw. A torch height Ht (welding motion feature amount) is a distance between the welding torch 2 and the welded body 3, and an appropriate range thereof is referred to as an appropriate torch height range AHt. A welding direction speed Sp (welding motion feature amount) is a speed of the welding torch 2 in the welding direction, and an appropriate range thereof is referred to as an appropriate welding direction speed range ASp. A current value Iw (welding phenomenon feature amount) is a value of a current supplied from the power supply 8 to the welding torch 2. Furthermore, the area S and the symmetry Ssym are as described above with reference to FIG. 6.

Among the feature amounts described above, the weaving interval Tw, the torch height Ht, the welding direction speed Sp, or the like may be referred to as the "feature amount of the welding motion". The current value Iw, the molten pool area S, the symmetry Ssym, or the like may be referred to as the "welding quality parameter". In the illustrated example, an unexpected change occurs in the current value Iw and the molten pool area S at a timing corresponding to a position X1. Then, the torch height Ht and the welding direction speed Sp are changed at a timing corresponding to the subsequent position X2.

Figure 8:
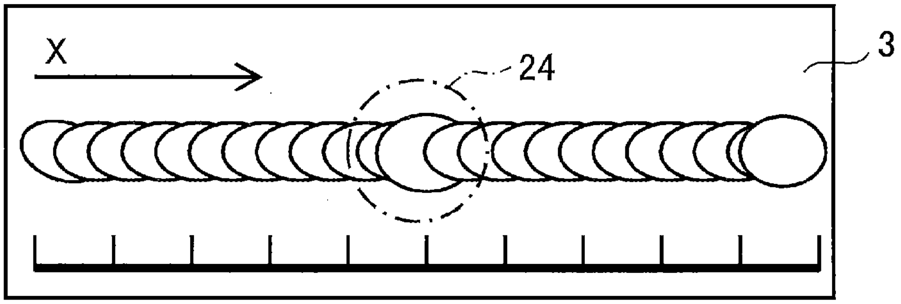
FIG. 8 is a schematic view of a welded body subjected to welding by the skilled operator.

FIG. 8 is a schematic view of the welded body 3 subjected to welding by the welding operator 1 who is the skilled operator. The welded body 3 was evaluated for defects by the ultrasonic flaw detection, and it was confirmed that there was no defect in the entire welded body 3. Therefore, it is considered that the operator changed the motion of the welding torch 2 according to the current change occurring at the position X1 in FIG. 7 to prevent the occurrence of the defect. Note that the position X1 in FIG. 7 corresponds to a region 24 in FIG. 8. That is, since the current value Iw is increased and the molten pool area S is excessively large, a motion that increases the torch height Ht and swings the welding torch 2 in the welding direction to adjust the shape of the molten pool is made. Therefore, such a motion is referred to as the "correction motion", and data in which the correction motion is recorded is referred to as "correction motion data". The data analysis unit 14 (see FIG. 1) also records the correction motion data in the data accumulation unit 15.

Figure 9:
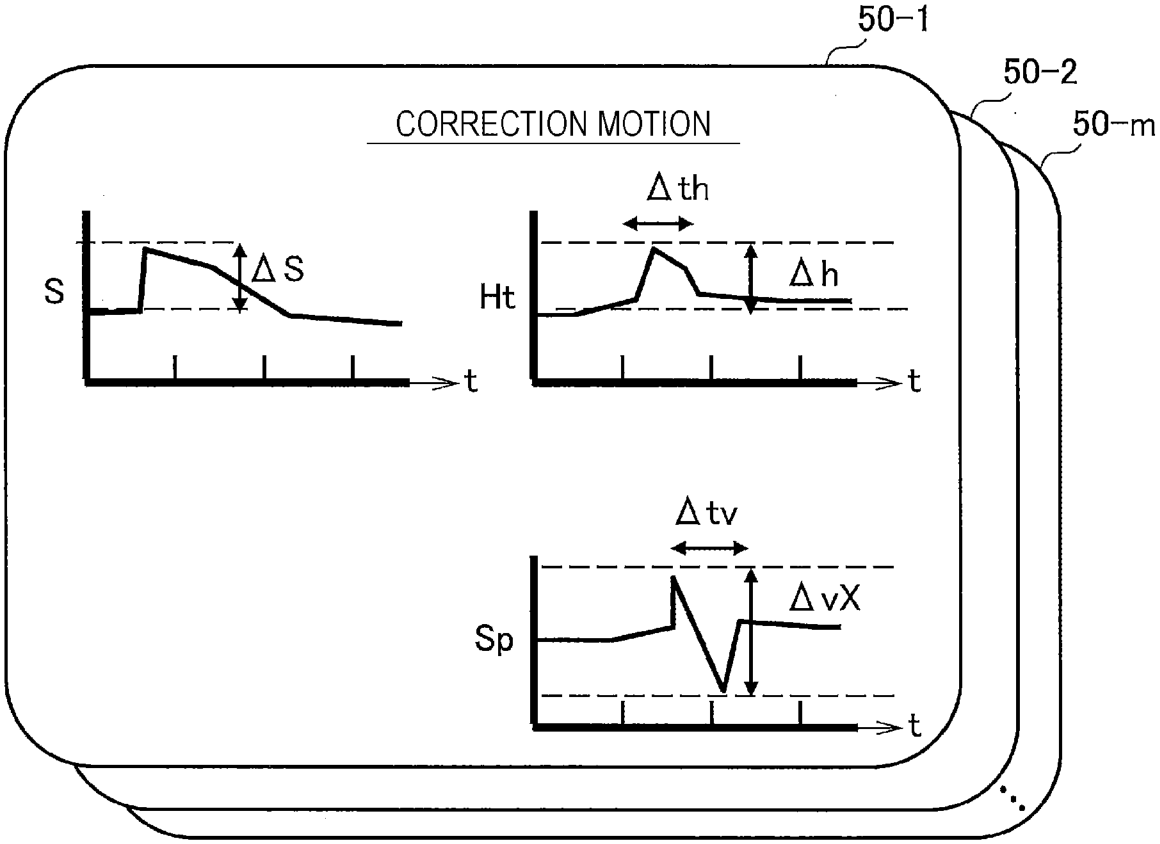
FIG. 9 is a schematic diagram of correction motion data recorded in a data accumulation unit.

FIG. 9 is a schematic diagram of the correction motion data recorded in the data accumulation unit 15 (see FIG. 1). In the illustrated example, m pieces of correction motion data 50-1 to 50*m* represent a change state of the "feature amount of the welding motion (Tw, Ht, Sp, or the like)" corresponding to a change state of the "welding quality parameter (Iw, S, Ssym, or the like)". For example, the correction motion data 50-1 includes data on a temporal change of the molten pool area S corresponding to a time t and data on temporal changes of the torch height Ht and the welding direction speed Sp corresponding to the temporal change of the molten pool area S. According to the correction motion data 50-1, when the molten pool area S is changed by ΔS, the torch height Ht is changed within a range of Δh within in a period of Δth. The welding direction speed Sp is changed within a range of ΔvX in a period of Δtv. These deviate from a standard motion of the skilled operator.

Hereinafter, the standard motion of the skilled operator is referred to as a "standard motion", and a range of various parameters belonging to the "standard motion" is referred to as a "standard motion range". In addition, data in which the standard motion is recorded is referred to as "standard motion data". In other words, it can be considered that a range in which there is no deviation in the temporal change of the current value Iw, the temporal change of the vibration (sound), the shape of the molten pool 20 (see FIG. 6), and the like during the work performed by the skilled operator is the "standard motion range". Therefore, the standard motion data for the exemplary motion and the correction motion data are recorded in the data accumulation unit 15. The other pieces of correction motion data 50-2 to 50*m* illustrated in FIG. 9 are also data in which the correction motion of the skilled operator deviating from the standard motion range is recorded, similarly to the correction motion data 50-1.

When the correction motion data 50-1 to 50*m* are recorded in the data accumulation unit 15 (see FIG. 1), the above-described respective parameters ΔS, Δth, Δh, ΔvX, and Δtv may be recorded as correlation functions based on motions or physical correlations recorded a plurality of times. The standard motion range described above may be set to a motion range standardized using a standard deviation or a Nahalanobis distance based on the standard motions of a plurality of skilled operators. Furthermore, in a case where features of the motions of different skilled operators are different from each other, for example, a plurality of standard motion ranges such as "standard motion range #1" and "standard motion range #2" may be classified and recorded.

The correction motion data 50-1 to 50*m* recorded in the data accumulation unit 15 may be records of vibration (sound) or the like at the time of welding in addition to the above-described data. That is, when a measured value of the vibration (sound) at the time of welding deviates from stable values before and after the current measured value, the correction motion data 50-1 to 50*m* may include a motion that changes the torch height Ht and the welding direction speed Sp and is made by the operator to correct the vibration (sound) at the time of welding to an appropriate range and a motion that changes the angle of the welding torch 2.

In the embodiment described above, the motion that makes an appropriate correction for the change of the welding quality parameter that has occurred naturally is recorded as the "correction motion". However, the welding work environment (for example, the root gap, the groove angle, or the like) and the welding quality parameter (for example, a current or the like) may be intentionally changed, and a motion that is appropriately made in response to the change of the welding work environment of the welding work and the change of the welding quality parameter may be recorded as the "correction motion".

Next, the welding phenomenon measurement system 100 (see FIG. 1) is used to measure the motion of the welding operator 1 who is an unskilled operator, analyze the feature amount of the welding motion (Tw, Ht, Sp, or the like), and record the analysis result in the data accumulation unit.

Figure 10:
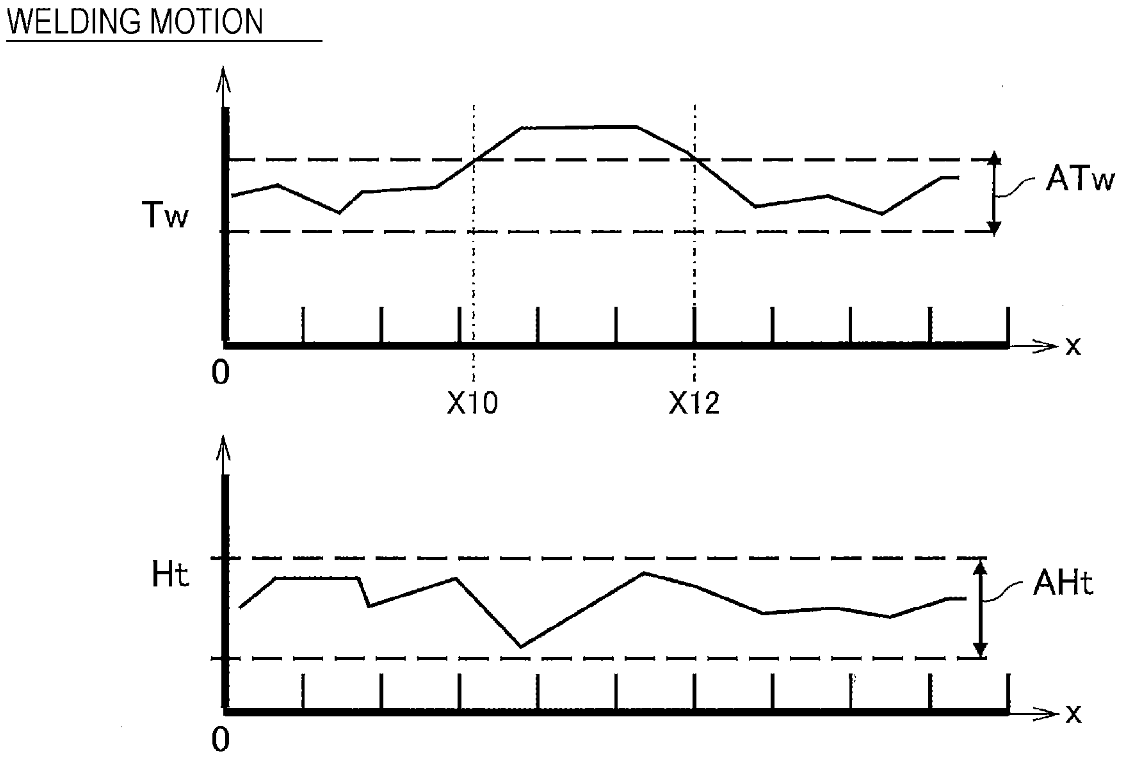
FIG. 10 is a diagram illustrating temporal changes of a weaving interval and a torch height of the unskilled operator.

FIG. 10 is a diagram illustrating temporal changes of the weaving interval Tw and the torch height Ht of the unskilled operator. The motion of the unskilled operator partially deviates from the standard motion range recorded in the data accumulation unit 15. That is, in a range from a position X10 to a position X12, the weaving interval Tw deviates from the appropriate weaving interval range ATw.

When the motion range of the welding operator 1 who is the unskilled operator deviates from the standard motion range, the data analysis unit 14 calculates the deviation. Then, throughout the entire process, the data analysis unit 14 subtracts a value obtained by multiplying a standard deviation of the deviation by a coefficient from a maximum of 100 points to obtain a "score". In addition, six items including the welding direction speed Sp, a weaving width, and torch angles (an angle in a bevel direction and advancing and retreating angles) are similarly scored.

Figure 11:
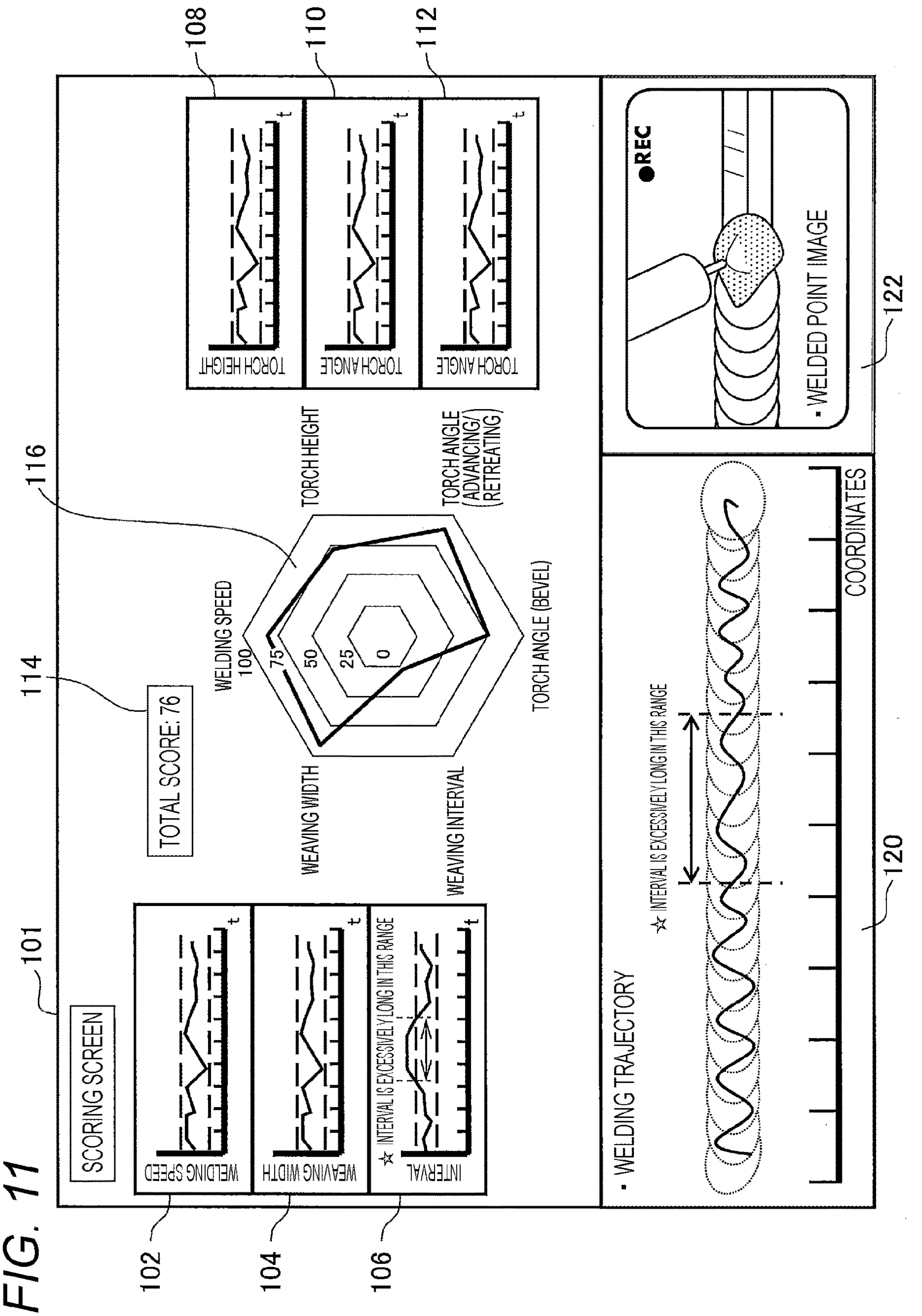
FIG. 11 is a view illustrating an example of a display screen of a display.

FIG. 11 is a view illustrating an example of a display screen 101 of the display included in the output device 18 (see FIG. 1).

A display content of the display screen 101 is controlled by the information notification unit 32 (see FIG. 1). In the display screen 101, a welding speed display field 102 displays a temporal change of the welding direction speed Sp. A weaving width display field 104 displays a temporal change of the weaving width. A weaving interval display section 106 displays a temporal change of the weaving interval Tw. In addition, a torch height display section 108 displays a temporal change of the torch height Ht. Further, an advancing/retreating direction torch angle display section 110 displays a temporal change of the torch angle in the advancing/retreating direction along the welding direction. In addition, a bevel direction torch angle display section 112 displays a temporal change of the torch angle in a direction orthogonal to the welding direction. Here, the information notification unit 32 (see FIG. 1) can display a warning message on each of the display sections 102 to 112 as necessary. For example, in the illustrated example, the weaving interval display section 106 displays a warning message that "the interval is excessively long in this range".

In addition, a radar chart display section 116 displays a radar chart of the "score" described above for each of the welding direction speed Sp, the weaving width, the weaving interval Tw, the torch height Ht, the advancing/retreating direction torch angles, and the bevel direction torch angle.

In addition, a total score display section 114 displays a total score that is an average value of the respective scores described above. A welding trajectory display section 120 displays a welding trajectory. The information notification unit 32 (see FIG. 1) can also display a warning message in the welding trajectory display section 120 as necessary. For example, in the illustrated example, similarly to the weaving interval display section 106 described above, a warning message that "the interval is excessively long in this range" is displayed. A welded point image display section 122 displays an image of a welded point captured by the molten pool observation camera 5 (see FIG. 5).

In the example illustrated in FIG. 11, it can be seen that the welding quality parameter (Iw, S, Ssym, or the like) other than the weaving interval and the feature amount of the welding motion (Tw, Ht, Sp, or the like) belong to an appropriate range, that is, the standard motion range. Therefore, it is understood that the skill of the unskilled operator who is the current measurement target can be improved by paying attention to the weaving interval next time. As described above, according to the present embodiment, the motion of the skilled operator and the motion of the unskilled operator are compared, and the motion is acquired as explicit knowledge and reflected in the next motion, such that the training for the unskilled operator can be effectively performed.

(Specific Example of Welding Skill Determination)

Next, a specific example in which skill determination is performed using the quality control unit 34 (see FIG. 1) will be described.

First, in the welding work for the welded body 3 (see FIG. 1) which is an actual product, the quality control unit 34 records the measurement result of the coordinates of the tip of the welding torch 2 during the welding work and the signal related to the welding phenomenon (welding quality parameter (Iw, S, Ssym, or the like)). Next, the quality control unit 34 compares the feature amount extracted based on the measurement result of the motion of the tip of the welding torch 2 and the welding quality parameter during the welding work for the actual product with the welding database 70 constructed in advance in the data accumulation unit 15. More specifically, it is determined whether or not the welding motion is within the standard motion range. In addition, it is determined whether or not an appropriate welding motion recorded in the welding database 70 is made at a point where the welding quality parameter (Iw, S, Ssym, or the like) indicating "a behavior showing a sign of occurrence of a defect" is recorded in the welding database 70. Then, the quality control unit 34 records the determination result.

Figure 12:
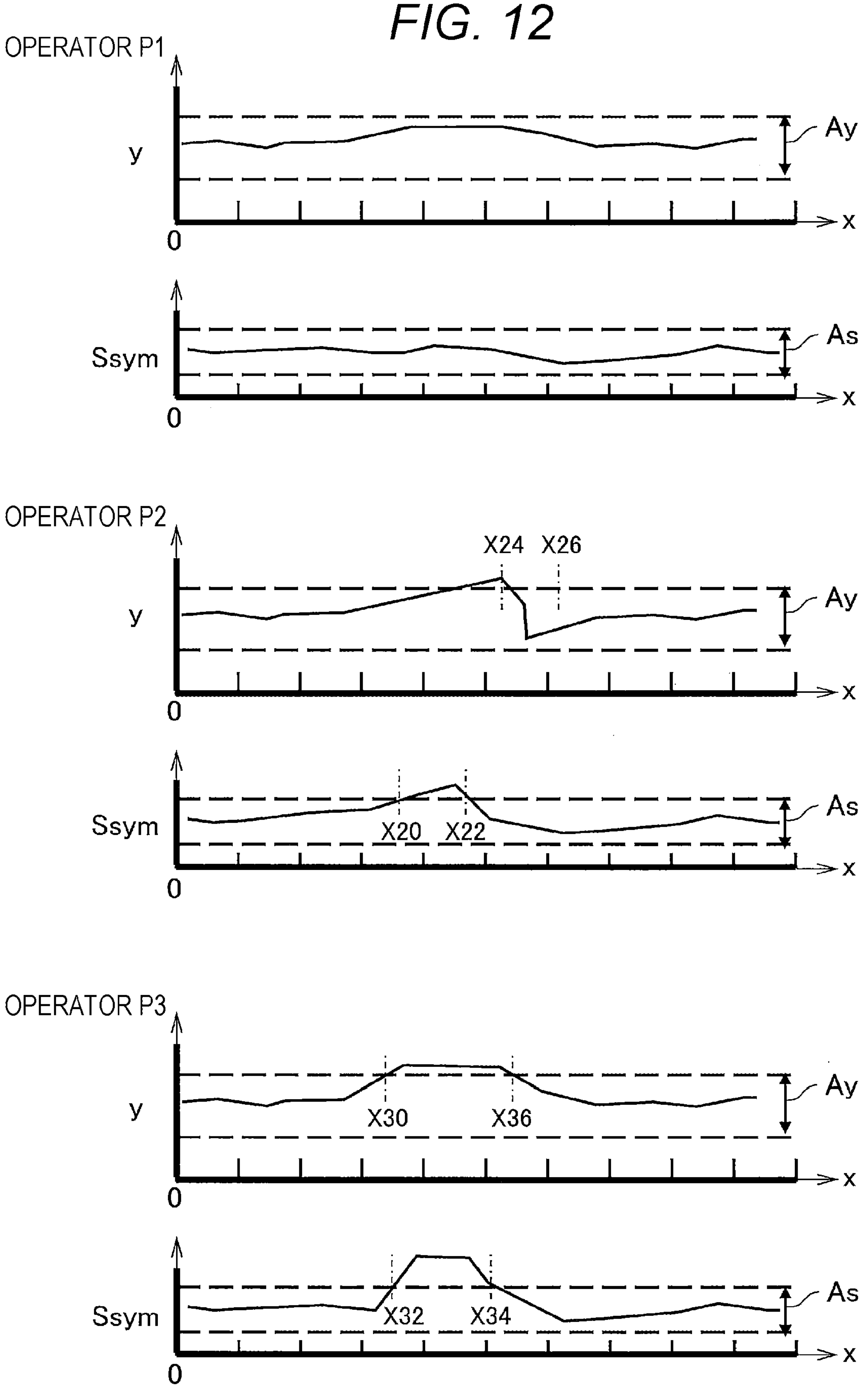
FIG. 12 is a diagram illustrating results of measuring a horizontal coordinate and the symmetry of the molten pool for a plurality of operators.

FIG. 12 is a diagram illustrating results of measuring a horizontal coordinate y and the symmetry Ssym of the molten pool for a plurality of operators P1, P2, and P3.

A horizontal axis x in various graphs illustrated in FIG. 12 represents the amount of movement in the welding direction. The horizontal coordinate y is a coordinate in a direction orthogonal to the welding direction. Further, an appropriate horizontal coordinate range Ay indicates a standard motion range of the horizontal coordinate y, and an appropriate symmetry range As indicates a standard motion range of the symmetry Ssym.

In the work performed by the operator P1, both the horizontal coordinate y and the symmetry Ssym are within the standard motion range, and other welding quality parameters (not illustrated) are also within the prescribed range.

In addition, in the work performed by the operator P2, the symmetry Ssym deviates from the appropriate symmetry range As in a range of positions X20 to X22. Thereafter, the horizontal coordinate y is greatly changed in the vicinity of positions X24 to X26. This motion corresponds to the "correction motion" in the welding database 70 of the data accumulation unit 15.

In the work performed by the operator P3, the horizontal coordinate y is out of the appropriate horizontal coordinate range Ay in a range of positions X30 to X36. Accordingly, the symmetry Ssym is out of the appropriate symmetry range As in a range of positions X32 to X34. In addition, an appropriate correction motion has not been made within the range of the positions X30 to X36. As a result of the ultrasonic flaw inspection, it was found that a corresponding portion of the welded body 3 welded by the operator P3 is poorly fused, and thus the welding work was performed again.

As described above, according to the present embodiment, the feature amount (Tw, Ht, Sp, or the like) of the welding motion of the welding operator at the time of welding the actual product is recorded and compared with the exemplary motion recorded in the constructed welding database 70, such that it is possible to leave evidence whether or not the corresponding portion is appropriately welded. In addition, it is possible to specify a motion that has caused the defect by comparing the defect detected by the inspection with the recorded welding motion.

(Specific Example of Welding Assistance Operation)

Next, a specific example of a welding assistance operation using the correction instruction unit 36 (see FIG. 1) will be described.

Figure 13:
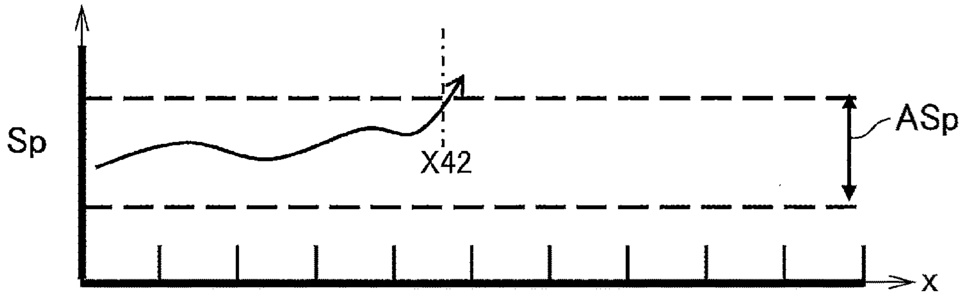
FIG. 13 is a diagram illustrating an example of a welding direction speed.

FIG. 13 is a diagram, illustrating an example of the welding direction speed Sp. Note that a horizontal axis x in FIG. 13 represents the amount of movement in the welding direction. In the illustrated example, the welding direction speed Sp deviates from the appropriate welding direction speed range ASp at a timing corresponding to a position X42. When various feature amounts and the like deviate from the standard motion range as described above, the correction instruction unit 36 (see FIG. 1) outputs an instruction or a warning to the welding operator 1 via the output device 18. For example, a speech "slow down the torch movement" may be output via the speaker included in the output device 18. In addition, a warning may be displayed on the display included in the output device 18. The instruction or warning for the welding operator 1 may be output via a head-mounted display (not illustrated) mounted on the welding operator 1, or may be output by a method of applying a pressure to the glove 12 (see FIG. 3) or work clothes.

<Effects of First Embodiment>

As described above, the welding phenomenon measurement system 100 according to the present embodiment includes the measurement unit (4, 5, 7, 9, 11, and 16) that measures a state of the welded body (3) and a state of the welding operator (1) when the welding operator (1) grips the welding torch (2) and performs welding on the welded body (3), and the data accumulation unit (15) that extracts the line of sight of the welding operator (1), the shape of the molten pool (20) formed in the welded body (3), the angle of the welding torch (2) with respect to the welded body (3), the coordinates of the tip of the welding torch (2), the sound caused by the welding, the pressure applied to the welding operator (1), the amount of heat applied to the welded portion of the welded body (3), or the heat applying direction with respect to the welded portion of the welded body (3) based on the data acquired by the measurement unit (4, 5, 7, 9, 11, and 16) and creates the database (70) based on the extraction result.

The data analysis unit (14) extracts an appropriate combination of the welding motion feature amount (Tw, Ht, and Sp) and the welding phenomenon feature amount (Iw, S, and Ssym) in correlation with time or coordinates based on the data acquired by the measurement unit (4, 5, 7, 9, 11, and 16), and the data accumulation unit (15) creates the database (70) based on the extraction result of the data analysis unit (14).

As a result, it is possible to create the database (70) for appropriately performing the welding quality control.

In addition, the measurement unit (4, 5, 7, 9, 11, and 16) includes the motion capture system (4) that measures the motion of the welding torch (2), and further includes the data analysis unit (14) that acquires an appropriate combination of the feature amount that is any one of the line of sight of the welding operator (1), the shape of the molten pool (20) formed in the welded body (3), the angle of the welding torch (2) with respect to the welded body (3), the sound caused by welding, the pressure applied to the welding operator (1), the amount of heat applied to the welded portion of the welded body (3), the heat applying direction with respect to the welded portion of the welded body (3), and the welding current supplied to the welding torch (2) or the welding voltage applied to the welding torch (2), and the motion of the welding torch (2).

As a result, it is possible to obtain an appropriate combination of the motion of the welding torch (2) and the feature amount.

In addition, the measurement unit (4, 5, 7, 9, 11, and 16) includes the motion capture system (4) that measures the motion of the welding torch (2) as the welding motion with a coordinate resolution of less than 1 cm and further measures the motion of the welding torch (2) as the welding motion.

As a result, it is possible to measure the motion of the welding torch (2) more accurately.

In addition, the measurement unit (4, 5, 7, 9, 11, and 16) includes any one of the molten pool observation camera (5) that captures an image of the molten pool, the motion capture system (4) that measures the motion of the welding torch (2), the line-of-sight camera (11) that detects the line of sight of the welding operator (1), the vibration sensor (7) that measures vibration caused by welding, the microphone that collects sound caused by welding, and the torch pressure sensor (16) that measures the pressure applied to the welding operator (1) from the welding torch (2).

As a result, it is possible to output a suitable motion in the welding work as digital data by storing the feature amount of the work for each welding condition and skill level in a database. In addition, it is possible to efficiently instruct the skills, improve manufacturing quality, and contribute to reduction in defect rate.

The welding phenomenon measurement system 100 further includes the information notification unit (32) that notifies the welding operator (1) of the information regarding the quality of the welding motion based on the feature amount (Tw, Ht, and Sp) extracted based on the coordinates of the tip of the welding torch (2) and the database (70) constructed in advance. As a result, the welding operator (1) can appropriately determine the quality of the welding motion.

The welding phenomenon measurement system 100 further includes the welding work environment input unit (17) that receives the information regarding the welding work environment, and the data analysis unit (14) analyzes the welding motion feature amount (Tw, Ht, and Sp) and the welding phenomenon feature amount (Iw, S, and Ssym) based on the information regarding the welding work environment and the data acquired by the measurement unit (4, 5, 7, 9, 11, and 16). As a result, various quality controls can be appropriately performed.

The welding phenomenon measurement system 100 further includes the correction instruction unit (36) that issues the correction instruction to the welding operator (1) when the feature amount (Tw, Ht, and Sp) deviates from a predetermined range based on the feature amount (Tw, Ht, and Sp) extracted based on the coordinates of the tip of the welding torch (2) and the database (70) constructed in advance. As a result, the welding operator (1) can appropriately determine whether or not to issue the correction instruction.

In another point of view, the welding phenomenon measurement system 100 is the welding work support system (100) including a database storage unit (65) that stores the created database (70), and the information notification unit (32) that notifies the welding operator (1) of the information regarding the quality of the welding motion based on information of the database (70) stored in the database storage unit (65) and the welding motion feature amount (Tw, Ht, and Sp) and the welding phenomenon feature amount (Iw, S, and Ssym) extracted from data newly acquired by the measurement unit (4, 5, 7, 9, 11, and 16).

As a result, appropriate welding work support can be performed based on the stored database (70).

The welding phenomenon measurement system 100 further includes the quality control unit (34) that records the information regarding the quality of the welding motion based on the information of the database (70) stored in the database storage unit (65) and the welding motion feature amount (Tw, Ht, and Sp) and the welding phenomenon feature amount (Iw, S, and Ssym) extracted from the data newly acquired by the measurement unit (4, 5, 7, 9, 11, and 16). As a result, an appropriate quality control can be performed.

The welding phenomenon measurement system 100 further includes the correction instruction unit (36) that issues the correction instruction to the welding operator (1) in a case where the welding motion feature amount (Tw, Ht, and Sp) or the welding phenomenon feature amount (Iw, S, and Ssym) deviates from the predetermined range based on the information of the database (70) accumulated in the data accumulation unit (15) and the welding motion feature amount (Tw, Ht, and Sp) and the welding phenomenon feature amount (Iw, S, and Ssym) extracted from the data newly acquired by the measurement unit (4, 5, 7, 9, 11, and 16). As a result, an appropriate correction instruction can be issued to the welding operator (1).

Second Embodiment

Figure 14:
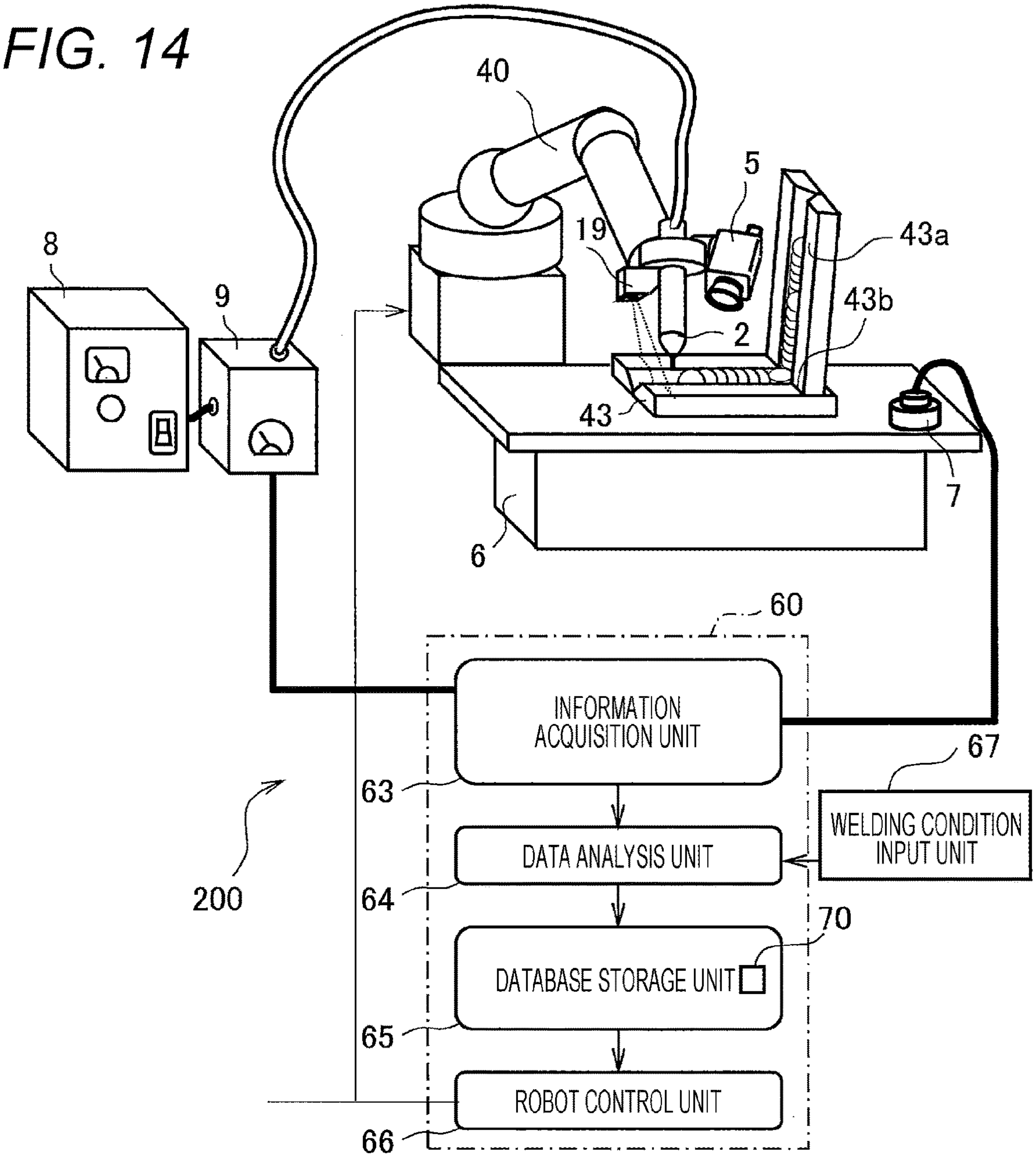
FIG. 14 is a schematic view of an automatic welding system according to a second embodiment of the present invention.

FIG. 14 is a schematic diagram of an automatic welding system 200 according to a second embodiment of the present invention. Note that, in the following description, portions corresponding to the respective portions of the first embodiment are denoted by the same reference signs, and a he description thereof may be omitted.

In FIG. 14, the automatic welding system 200 includes an electric measurement device 9, a welding robot 40, a control device 60 (welding robot control device), and a piezoelectric element 7. Further, a welding torch 2, a molten pool observation camera 5, a power supply 8, and a laser displacement meter 19 are mounted on the welding robot 40.

The control device 60 includes hardware as a general computer, such as a CPU, a RAM, a ROM, and an SSD, and the SSD stores an OS, an application program, various data, and the like. The OS and the application program are loaded in the RAM and executed by the CPU. In FIG. 14, functions implemented by the application program and the like are illustrated as blocks in the control device 60. That is, the control device 60 includes an information acquisition unit 63, a welding condition input unit 67, a data analysis unit 64, a database storage unit 65, and a robot control unit 66. Here, the information acquisition unit 63 and the data analysis unit 64 have functions similar to those of the information acquisition unit 13 and the data analysis unit 14 in the first embodiment (see FIG. 1). The functions of the database storage unit 65 and the robot control unit 66 will be described later.

In the illustrated example, a welded body 43 is two L-shaped plates abutting each other, and the automatic welding system 200 welds these L-shaped plates. In a welding procedure, vertical downward welding is performed from a welding start point 43*a* near an upper end of the welded body 43, and the welding torch 2 is directed downward after crossing a bent portion 43*b* of the L-shaped plate. As a result, a more complicated motion is made by the welding torch 2 as compared with a case of welding the flat welded body 3 illustrated in FIG. 1.

Before the automatic welding system 200 is operated, in the welding phenomenon measurement system 100 (see FIG. 1) of the first embodiment, the welding operator 1 who is the skilled operator welds the welded body 43 that is two L-shaped plates abutting each other, and data in which the information regarding the welding environment, the welding motion, and the welding phenomenon are correlated by the data analysis unit 14 is accumulated in the data accumulation unit 15.

Figure 15:
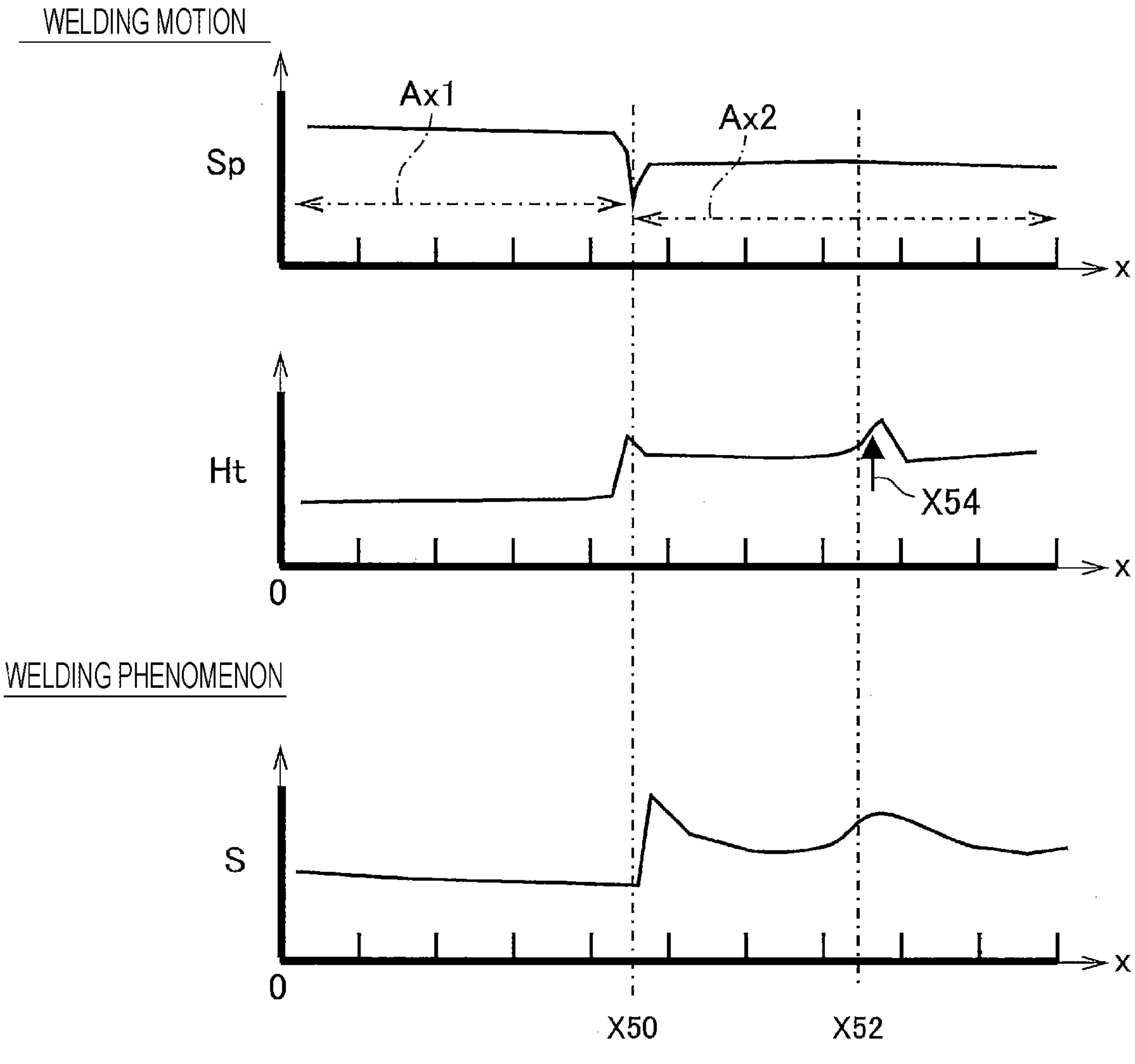
FIG. 15 is a diagram illustrating an example of the feature amounts and the like of the skilled operator.

FIG. 15 is a diagram illustrating an example of the feature amounts and the like of the skilled operator in the welding phenomenon measurement system 100. A horizontal axis x in various graphs illustrated in FIG. 15 represents the amount of movement in the welding direction. The meanings of the welding direction speed Sp, the torch height Ht, and the molten pool area S are the same as those in the first embodiment. A position X50 in the drawing corresponds to the bent portion 43*b* of the welded body 43, and vertical downward welding is performed in a range Ax1, and flat welding is performed in a range Ax2. According to the illustrated example, it is understood that the torch height Ht is lower and the welding direction speed Sp is higher in the range Ax1 in which the vertical downward welding is performed as compared with the range Ax2 in which the flat welding is performed. At the position X50 corresponding to the bent portion 43*b*, the welding direction speed Sp is once decreased.

As features of the welding phenomenon, the molten pool area S is small in the range Ax1 where the vertical downward welding is performed, and the molten pool area S is large at the bent portion in the vicinity of the position X50 corresponding to the bent portion 43*b*. In the range Ax2 where the flat welding is performed, the molten pool area S is larger than that in the range Ax1. Further, at a position X52 in the drawing, a sudden change occurs, and the molten pool area S is increased. Then, the torch height Ht rises at a position X54 immediately next to the position X52. According to this measurement result, it is understood that the torch height Ht is increased as the correction motion when the molten pool area S is increased during welding.

Next, the skilled operator is caused to perform the welding work on the welded body 43 having the same shape a plurality of times, and the welding database including the standard motion range and the correction motion as the exemplary motion is constructed in the data accumulation unit 15. The welding database 70 constructed in the data accumulation unit 15 is copied to the database storage unit 65 in the automatic welding system 200 (see FIG. 14).

The welding condition input unit 67 receives the flow rate of the shielding gas used for welding, the feeding speed of the welding wire, the material of the welding wire, the setting of the welding power supply, and the shape of the welded portion measured by the laser displacement meter 19.

The robot control unit 66 programs, for the welding robot 40, a motion simulating the motion of the skilled operator based on information input from the welding condition input unit 67 and the welding database 70 copied to the database storage unit 65, and causes the welding robot 40 to perform welding.

Figure 16:
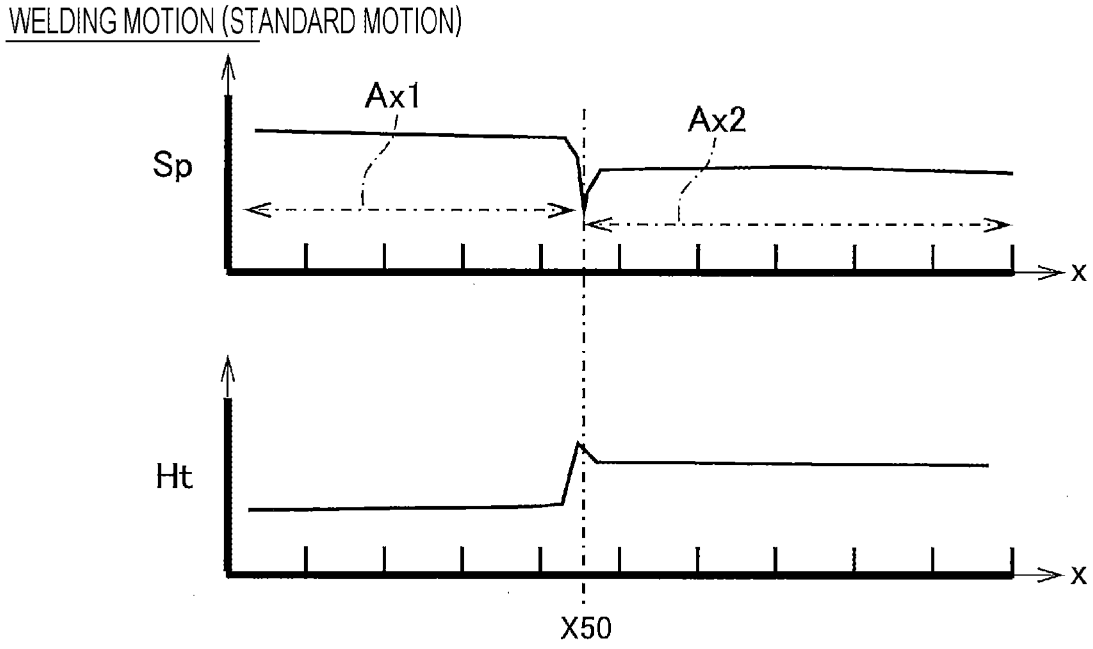
FIG. 16 is a diagram illustrating an example of a standard motion of a welding robot.

FIG. 16 is a diagram illustrating an example of the standard motion set in the welding robot 40 by the robot control unit 66. That is, the welding robot 40 controls the welding direction speed Sp and the torch height Ht in principle according to FIG. 16. Note that the meanings of the position X50 and the ranges Ax1 and Ax1 in the drawing are similar to those illustrated in FIG. 15.

Figure 17:
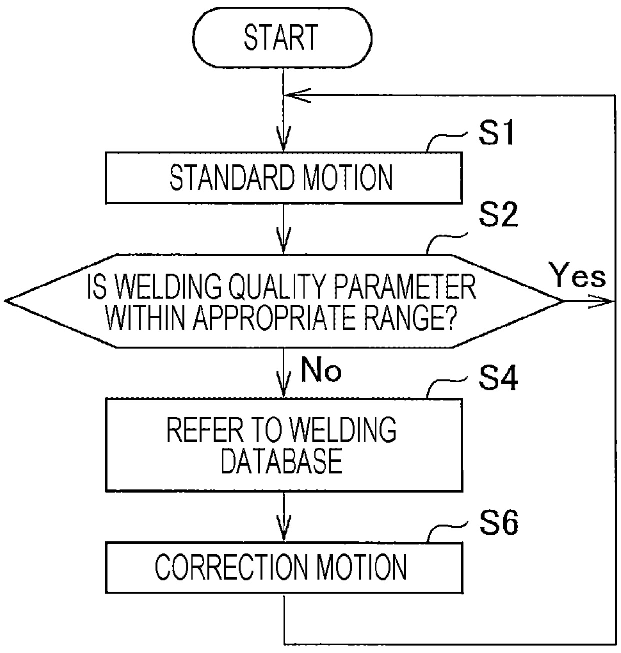
FIG. 17 is a flowchart of a program executed in a welding robot 40.

FIG. 17 is a flowchart of a program executed by the robot control unit 66.

When the processing proceeds to Step S1 in the drawing, the robot control unit 66 causes the welding robot 40 to make the standard motion. Next, when the processing proceeds to Step S2, the robot control unit 66 determines whether or not the welding quality parameter (Iw, S, Ssym, or the like) is within an appropriate range. Then, Step S1 is repeated until it is determined that the welding quality parameter (Iw, S, Ssym, or the like) is not within the appropriate range ("No"), and the welding robot 40 continues the standard motion. That is, the welding robot 40 controls the welding direction speed Sp and the torch height Ht according to FIG. 16.

Meanwhile, when any welding quality parameter such as the molten pool area S or the generated sound is out of the appropriate range, it is determined in Step S2 that the welding quality parameter is not within the appropriate range ("No"), and the processing proceeds to Step S4. In Step S4, the robot control unit 66 refers to the welding database 70 stored in the database storage unit 65, and reads the correction motion data corresponding to the current state. When the processing proceeds to Step S6, the robot control unit 66 causes the welding robot 40 to make the correction motion based on the read correction motion data. Thereafter, the processing returns to Step S2, and the above-described operation is repeated.

In the example described above, the welding direction speed Sp and the torch height Ht are adopted as the standard motion, but other motions may be adopted as the standard motion. For example, one or more of the followings may be adopted as the standard motion.

- A movement distance in the welding direction
- A speed in the welding direction
- A temporal change of the coordinates in a direction orthogonal to the welding direction (that is, a direction in which the torch is swung)
- A speed in a direction orthogonal to the welding direction
- A distance between the welded portion and the torch (that is, the torch height)
- A speed in a direction perpendicular to the welding direction (that is, a torch height direction)
- A frequency of a periodic change of the coordinates and the change of the frequency
- An amplitude and a variation of the amplitude of the periodic change of the coordinates In the example described above, the molten pool area S is monitored, but other information may also be monitored. For example, one or more of the followings may be monitored, and a change thereof may be analyzed in a complex manner to select the correction motion.

- The amount of heat applied obtained from an arc voltage/current measured by the electric measurement device 9
- information on occurrence of arc interruption or short circuit
- Information on the width of the molten pool 20 (see FIG. 6), the length of the molten pool 20, the molten pool area S, and a relative positional relationship between the molten pool 20 and the position of the tip of the torch
- Information on the spread of the arc and the arc length measured by the molten pool observation camera 5, and information on the amount of spatter generated, a frequency of the arc interruption, and a frequency of the short circuit
- Information on a sound pressure and a frequency obtained from the piezoelectric pressure sensor 16 or the microphone (not illustrated)
- Pressure information acquired from the piezoelectric pressure sensor 16 (see FIG. 3) of the glove 12
- Temperature distribution of the welded body 3 or 43 and temperature distribution of the molten pool 20 obtained by a temperature sensor (not illustrated).

As a method of selecting the correction motion based on a signal of the monitored welding phenomenon, the correction motion may be selected in a manner in which multivariate analysis or machine learning is used to evaluate correlation in a complex manner.

<Effects of Second Embodiment>

As described above, the welding robot control device (60) according to the present embodiment includes: the database storage unit (65) that stores the database (70) created by the welding work data accumulation device (100) including the measurement unit (4, 5, 7, 9, 11, and 16) that measures the state of the welded body (3) and the state of the welding operator (1) when the welding operator (1) grips the welding torch (2) and performs welding on the welded body (3), and the data accumulation unit (15) that extracts the line of sight of the welding operator (1), the shape of the molten pool (20) formed in the welded body (3), the angle of the welding torch (2) with respect to the welded body (3), the coordinates of the tip of the welding torch (2), the sound caused by the welding, the pressure applied to the welding operator (1), the amount of heat applied to the welded portion of the welded body (3), or the heat applying direction with respect to the welded portion of the welded body (3) based on the data acquired by the measurement unit (4, 5, 7, 9, 11, and 16) and creates the database (70) based on the extraction result; and the robot control unit (66) that controls the welding robot (40) based on the database (70), in which the robot control unit (66) has a function of instructing the welding robot (40) to perform the standard motion when a feature amount of a signal related to the welding phenomenon by the welding robot (40) is within a predetermined appropriate range, and a function of instructing the welding robot (40) to perform the correction motion when the feature amount deviates from the appropriate range.

In addition, from another viewpoint, the welding robot control device (60) includes: the database storage unit (65) that stores the database (70) created by the welding work data accumulation device (100) including the measurement unit (4, 5, 7, 9, 11, and 16) that measures the welding motion and the welding phenomenon when the welding operator (1) grips the welding torch (2) and performs welding on the welded body (3), the data analysis unit (14) that extracts an appropriate combination of the welding motion feature amount (Tw, Ht, and Sp) and the welding phenomenon feature amount (Iw, S, and Ssym) in correction with time or coordinates based on data acquired by the measurement unit (4, 5, 7, 9, 11, and 16), and the data accumulation unit (15) that creates the database (70) based on the extraction result of the data analysis unit (14); and the robot control unit (66) that controls the welding robot (40) based on the database (70).

In addition, the robot control unit (66) has at least one of a function of instructing the welding robot (40) to make an appropriate welding motion by referring to the data accumulation unit (15) based on the shape of the welded body (3) input at the start of the welding work, or a function of outputting the shape of the welded body measured by the welded portion shape measurement unit (19) that measures the shape of the welded portion and instructing the welding robot (40) to make an appropriate welding motion by referring to the data accumulation unit (15) during the welding performed by the welding robot (40).

Further, the robot control unit (66) has at least one of a function of instructing the welding robot (40) to make the standard motion when the welding phenomenon feature amount (Iw, and Ssym) is within a predetermined appropriate range during the welding performed by the welding robot (40) or a function of instructing the welding robot to make the correction motion when the welding phenomenon feature amount (Iw, S, and Ssym) deviates from the appropriate range.

As a result, the standard motion and the correction motion can be appropriately made by the welding robot (40).

Furthermore, according to the present embodiment, it is possible to output a suitable motion in the welding work as digital data by storing the motions of the skilled operators in a database, and it is possible to easily create the robot program without repetitive verification by constructing the robot program based on the motions of the skilled operators.

Furthermore, according to the present embodiment, it is possible to provide a welding motion measurement system capable of outputting a suitable motion in the welding work as digital data, efficiently performing skill instruction, improving manufacturing quality, and contributing to reduction of a defect rate, by storing the feature amounts of the work for each welding condition and skill level in a database.

Modified Example

The present invention is not limited to the above-described embodiments, and various modifications can be made. For example, the above-described embodiments have been described as examples in order to explain the present invention in an easy-to-understand manner, and the present invention is not necessarily limited to those having all the configurations described. Further, a part of a configuration of an embodiment can be replaced with a configuration of another embodiment, and a configuration of an embodiment can be added to a configuration of another embodiment. In addition, the configuration of each embodiment can be partially removed or another configuration can be added to and substituted for the configuration of the each embodiment. In addition, the control lines and information lines illustrated in the drawings indicate those that are considered necessary for explanation, and do not necessarily indicate all the control lines and information lines in the product. In practice, it can be considered that almost all configurations are interconnected. Possible modifications to the above embodiment are, for example, as follows.

(1) Since the hardware of the control devices 30 and 60 in the above embodiments can be implemented by a general computer, the flowchart illustrated in FIG. 17, a program for performing various processings described above, and the like may be stored in a storage medium or distributed via a transmission path.

(2) The processing illustrated in FIG. 17 and other processings described above have been described as software processing using a program in the above-described embodiment, but some or all of the processings may be replaced with hardware processing using an application-specific integrated circuit (ASIC), a field programmable gate array (FPGA), or the like.

REFERENCE SIGNS LIST

1 welding operator
2 welding torch
3, 43 welded body
4 motion capture system (measurement unit)
5 molten pool observation camera (measurement unit)
6 welding workbench
7 piezoelectric element (vibration sensor and measurement unit)
9 electric measurement device (measurement unit)
11 line-of-sight camera (measurement unit)
12 glove
13 information acquisition unit (measurement unit)
14 data analysis unit
15 data accumulation unit
16 piezoelectric pressure sensor (torch pressure sensor and measurement unit)
17 information input unit (welding work environment input unit)
18 output device
19 laser displacement meter (welded portion shape measurement unit)
20 molten pool
32 information notification unit
34 quality control unit
36 correction instruction unit
40 welding robot
60 control device (welding robot control device)
65 database storage unit
66 robot control unit
67 welding condition input unit
70 welding database (database)
100 welding phenomenon measurement system (welding work data accumulation device and welding work support system)
Ht torch height (welding motion feature amount)
Ssym symmetry (welding phenomenal feature amount)
S molten pool area (welding phenomenon feature amount)
Sp welding direction speed (welding motion feature amount)
Tw weaving interval (welding motion feature amount)
Iw current value (welding phenomenon feature amount)

The invention claimed is:

1. A welding work data accumulation device comprising:
a central processing unit (CPU) configured to:
measure, in real time, a welding motion and a welding phenomenon when a welding operator grips a welding torch and performs welding on a welded body;
correlate, in real time, a first welding motion feature amount with a first welding phenomenon feature amount based on measured coordinates of a tip of the welding torch and welding phenomenon signals including at least one of molten pool area, molten pool symmetry, welding current, or arc voltage, the first welding motion feature amount and the first welding phenomenon feature amount forming welding data;
create a database including:
the welding data; and
correction motion data comprising recorded adjustments to a respective welding motion feature in response to deviations in a corresponding welding phenomenon feature amount, the correction motion data stored in association with a type and a magnitude of the corresponding welding phenomenon deviation; and
issue, in real time, correction information to the welding operator derived from the correction motion data in response to a determination that a second welding motion feature amount or a second welding phenomenon feature amount deviates from a predetermined range based on the welding data.

2. The welding work data accumulation device according to claim 1, wherein the CPU is further configured to measure, as the welding motion, a motion of the welding torch with a coordinate resolution of less than 1 cm and a time resolution of 10 Hz or more, the motion correlated in real time with welding quality parameters as welding feature amounts.

3. The welding work data accumulation device according to claim 1, further comprising a motion capture system configured to measure a motion of the welding torch as the welding motion, the motion capture system comprising a plurality of cameras.

4. The welding work data accumulation device according to claim 3, further comprising any one of a molten pool observation camera that captures an image of a molten pool, a line-of-sight camera that detects a line of sight of the welding operator, a vibration sensor that measures vibration caused by the welding, a microphone that collects sound caused by the welding, and a torch pressure sensor that measures a pressure applied to the welding operator from the welding torch.

5. The welding work data accumulation device according to claim 1, wherein the CPU is further configured to receive information regarding a welding work environment, and analyze the second welding motion feature amount and the second welding phenomenon feature amount based on the information regarding the welding work environment, the welding motion, and the welding phenomenon.

* * * * *